United States Patent
Gupta et al.

(10) Patent No.: US 12,455,794 B2
(45) Date of Patent: *Oct. 28, 2025

(54) RELATIONAL SOFTWARE-AS-A-SERVICE DATA PROTECTION

(71) Applicant: Rubrik, Inc., Palo Alto, CA (US)

(72) Inventors: Anshul Gupta, Mountain View, CA (US); Sai Kiran Katuri, Santa Clara, CA (US); Amelia Vu, Mountain View, CA (US); Ayush Mishra, Patna (IN); Suman Swaroop, San Francisco, CA (US); Vaibhav Bhagee, New Delhi (IN)

(73) Assignee: Rubrik, Inc., Palo Alto, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 18/513,279

(22) Filed: Nov. 17, 2023

(65) Prior Publication Data

US 2025/0165353 A1    May 22, 2025

(51) Int. Cl.
*G06F 11/14* (2006.01)

(52) U.S. Cl.
CPC ...... *G06F 11/1464* (2013.01); *G06F 11/1451* (2013.01); *G06F 11/1461* (2013.01); *G06F 2201/84* (2013.01)

(58) Field of Classification Search
CPC ........... G06F 11/1464; G06F 11/1451; G06F 11/1461; G06F 2201/84
See application file for complete search history.

(56) References Cited

U.S. PATENT DOCUMENTS

| | | | |
|---|---|---|---|
| 10,872,059 B2 * | 12/2020 | Desai | G06F 16/128 |
| 2014/0279526 A1 * | 9/2014 | Jackson | G06Q 20/381 |
| | | | 705/44 |
| 2015/0310179 A1 * | 10/2015 | Chengat | G16Z 99/00 |
| | | | 705/3 |
| 2021/0109814 A1 * | 4/2021 | Dewey | G06F 3/067 |
| 2021/0117120 A1 * | 4/2021 | Edwards | G06F 3/0614 |
| 2021/0365185 A1 * | 11/2021 | Shtarkman | G06F 11/2094 |
| 2022/0171536 A1 * | 6/2022 | Watson | G06F 3/065 |
| 2024/0248991 A1 * | 7/2024 | Chinni | G06F 21/564 |
| 2024/0273226 A1 * | 8/2024 | Brajkovic | G06F 21/6218 |

* cited by examiner

*Primary Examiner* — Kamini B Patel
(74) *Attorney, Agent, or Firm* — Holland & Hart LLP

(57) ABSTRACT

Methods, systems, and devices for data management are described. Software-as-a-service (SaaS) applications may host customers' information in a distributed environment that is not directly accessible to the customers. SaaS applications may store data in the form of relational tables. Snapshots for SaaS applications may maintain hierarchical relationships between computing objects and tables to enable cascading recovery. A data management system (DMS) may identify the computing object hierarchy for an organization's data as hosted by a SaaS application and also may identify the APIs associated with accessing each computing object, which may each include multiple tables. Tables that are accessed via a same API may be organized as logical entities. The DMS may store the hierarchical relationship between the tables, and as the tables are stored as logical entities, the DMS may organize the tables in the backup database based on which APIs are used to access the relevant tables.

20 Claims, 10 Drawing Sheets

RELATIONAL SOFTWARE-AS-A-SERVICE DATA PROTECTION

FIELD OF TECHNOLOGY

The present disclosure relates generally to data management, including techniques for relational SaaS data protection.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
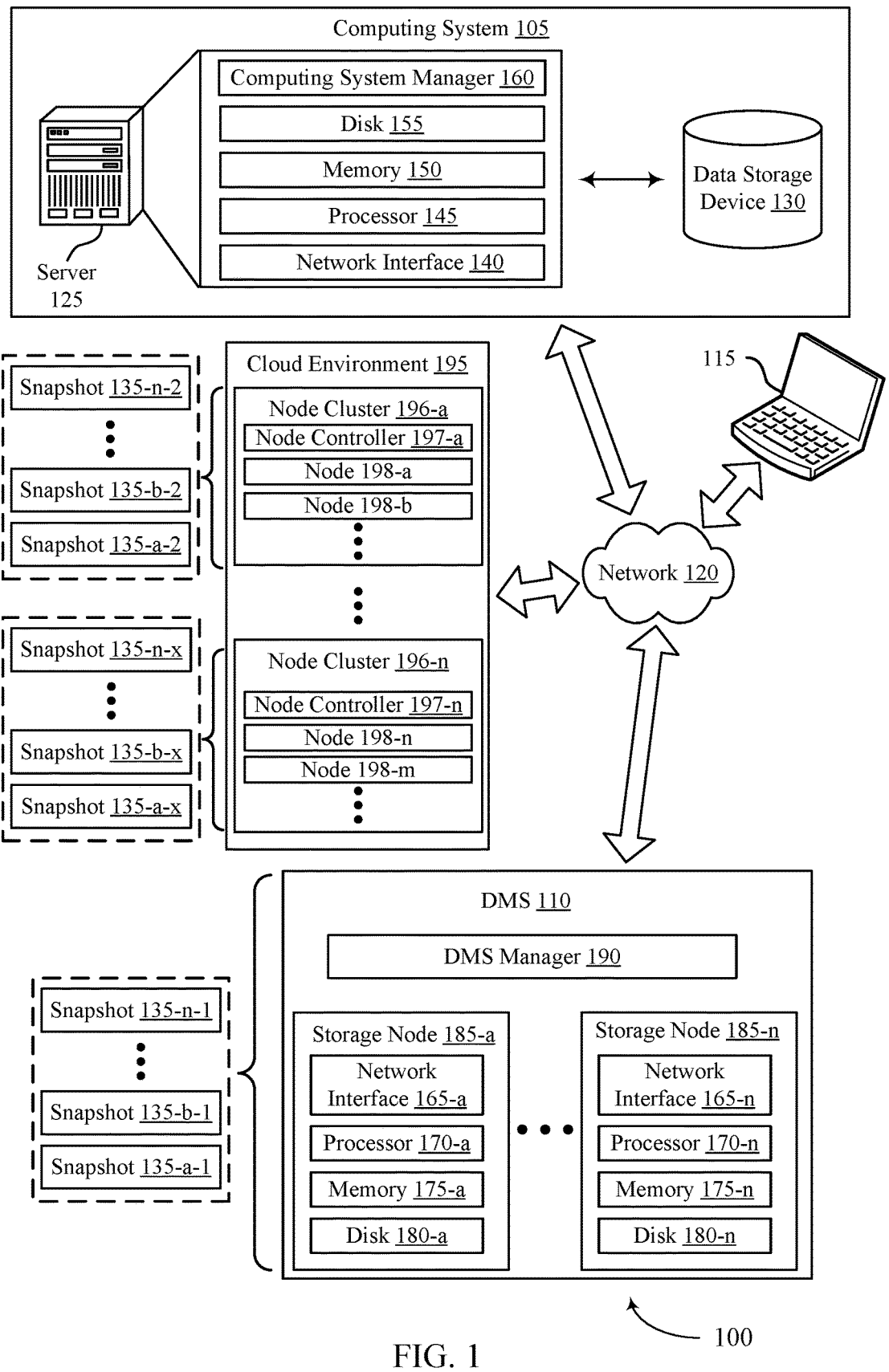
FIG. 1 illustrates an example of a computing environment that supports relational software-as-a-service (SaaS) data protection in accordance with aspects of the present disclosure.

Software-as-a-service (SaaS) applications (e.g., platforms) such as Salesforce and JIRA may host their customers' information in a distributed environment that is not directly accessible to the customers—e.g., customers of a SaaS application may have access to their associated data only via the SaaS application, such as through one or more application programming interfaces (APIs) associated with the SaaS application. Additionally, many SaaS applications store their customers' data in the form of relational tables, meaning that data is organized in tables that have hierarchical parent and child relationships. For example, for an organization that is a customer of a SaaS application, data for customers of that organization may have parent relationships with sales and location data for those customers. The SaaS data for the organization thus may include a set of hierarchical computing objects that are hosted by the SaaS application within the corresponding distributed environment, and accessing the SaaS data for that organization may involve calling multiple APIs. The hierarchical nature of SaaS data and the use of APIs for access may complicate the provision of backup and recovery services for such data. For example, accessing a single computing object may involve calling multiple APIs, where each API may access multiple tables within the distributed environment associated with the SaaS application.

A data management system (DMS) may maintain and store snapshots of computing objects for a client. To enable restoring client data for relational Saas applications, the hierarchical relationships between the tables that store the data should be maintained when backing up the client data. For example, if a client requests to restore parent data for a SaaS application, the child data that is associated with the parent data may also be restored. Further, for relational SaaS applications, the ordering of backup and restore operations may be important. For example, an application may require that parent data is backed up or restored before child data in order to maintain the parent-child hierarchical relationships.

Aspects of this disclosure relate to discovery and backup framework for relational SaaS applications that accommodates multiple associated APIs and maintains hierarchical relationships between computing objects and tables. For example, for a particular organization (e.g., customer of a SaaS application), the DMS may identify the computing object (e.g., snappable) hierarchy for that organization's data as hosted by the SaaS application and also may identify the APIs associated with accessing each snappable. Each snappable may include multiple tables, and tables that are accessed (and restored) via a same API may be organized as logical entities (e.g., table groups). The DMS may store the hierarchical relationship between the tables, and as the tables are stored as logical entities, the DMS may organize the tables in the backup database based on which APIs are used to access and restore the relevant tables. The discovery and backup framework for relational SaaS enables cascading restores associated with SaaS, where a cascading restore refers to the restoring of multiple associated hierarchical computing objects based on a selection to restore one or more computing objects in the hierarchy.

FIG. 1 illustrates an example of a computing environment 100 that supports relational SaaS data protection in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150) and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through SaaS or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below:

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-a may be associated with the first customer or tenant associated with the computing system 105. The DMS 110 may obtain (e.g., generate or receive) and transfer the snapshots 135 associated with the computing system 105 to the node cluster 196-a in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-n in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

In some examples, the DMS 110 may manage the extraction and storage of snapshots of a SaaS application. For example, the computing system 105 may be a SaaS application. SaaS applications may host customer information in a distributed environment that is not directly accessible to the customers—e.g., customers of a SaaS application may have access to their associated data only via the SaaS application, such as through one or more APIs associated with the SaaS application. Relational SaaS applications may store data in the form of relational tables, meaning that data is organized in tables that have hierarchical parent and child relationships. The SaaS data for the organization thus may include a set of hierarchical computing objects that are hosted by the SaaS application within the corresponding distributed environment, and accessing the SaaS data for that organization may involve calling multiple APIs. For example, SaaS applications may expose information via REST APIs.

To enable restoring client data for relational SaaS applications, the DMS 110 may maintain hierarchical relationships between the tables that store the data when backing up the client data. For example, if a client requests to restore parent data for a SaaS application, the DMS 110 may also restore child data that is associated with the parent data.

The DMS 110 may include a discovery framework, a backup framework or a cascading recovery framework for SaaS applications that accommodates multiple associated APIs and maintains hierarchical relationships. For example, snapshots 135 for relational SaaS applications may maintain hierarchical relationships between computing objects and tables in order to enable cascading recovery of SaaS applications. For example, for a particular organization (e.g., customer of a SaaS application), the DMS 110 may identify the computing object (e.g., snappable) hierarchy for that organization's data as hosted by the SaaS application and also may identify the APIs associated with accessing each snappable. Each snappable may include multiple tables, and tables that are accessed (and restored) via a same API may be organized as logical entities (e.g., table groups). The DMS 110 may store the hierarchical relationship between the tables, and as the tables are stored as logical entities, the DMS 110 may organize the tables in the backup database (e.g., at storage nodes 185 or at the cloud environment 195) based on which APIs are used to access and restore the relevant tables. Accordingly, the DMS 110 may perform a cascading restore associated with the Saas application. For example, based on a request to restore a computing object of a relational SaaS application, the DMS 110 may identify the associated computing objects to be recovered with the requested computing object based on the stored hierarchical information, and may call the relevant APIs to restore the requested computing object and the associated computing objects to be recovered with the requested computing object.

The schema used to store data by a DMS 110 (e.g., at the storage nodes 185 or at the node clusters 196 at the cloud environment 195) may not be the same as how the SaaS vendor stores data internally. The schema design may be driven by how the APIs expose information (e.g., which may determine how tables are grouped into entities). In some examples, not all relationships that are backed up may be considered during a restore operation. For example, how and when to cascade may depend on multiple factors including SaaS application type, the direction of the relationship to traverse, the nature of the restore, or custom options available to the backup administrator initiating the restore. Full restorations or bulk restorations may ensure ordering. For example, parent computing objects or tables may be restored before child objects or tables. As another example, a subtask may be restored after a parent task (e.g., a sales record may be restored after the customer record associated with the sales record).

Figure 2:
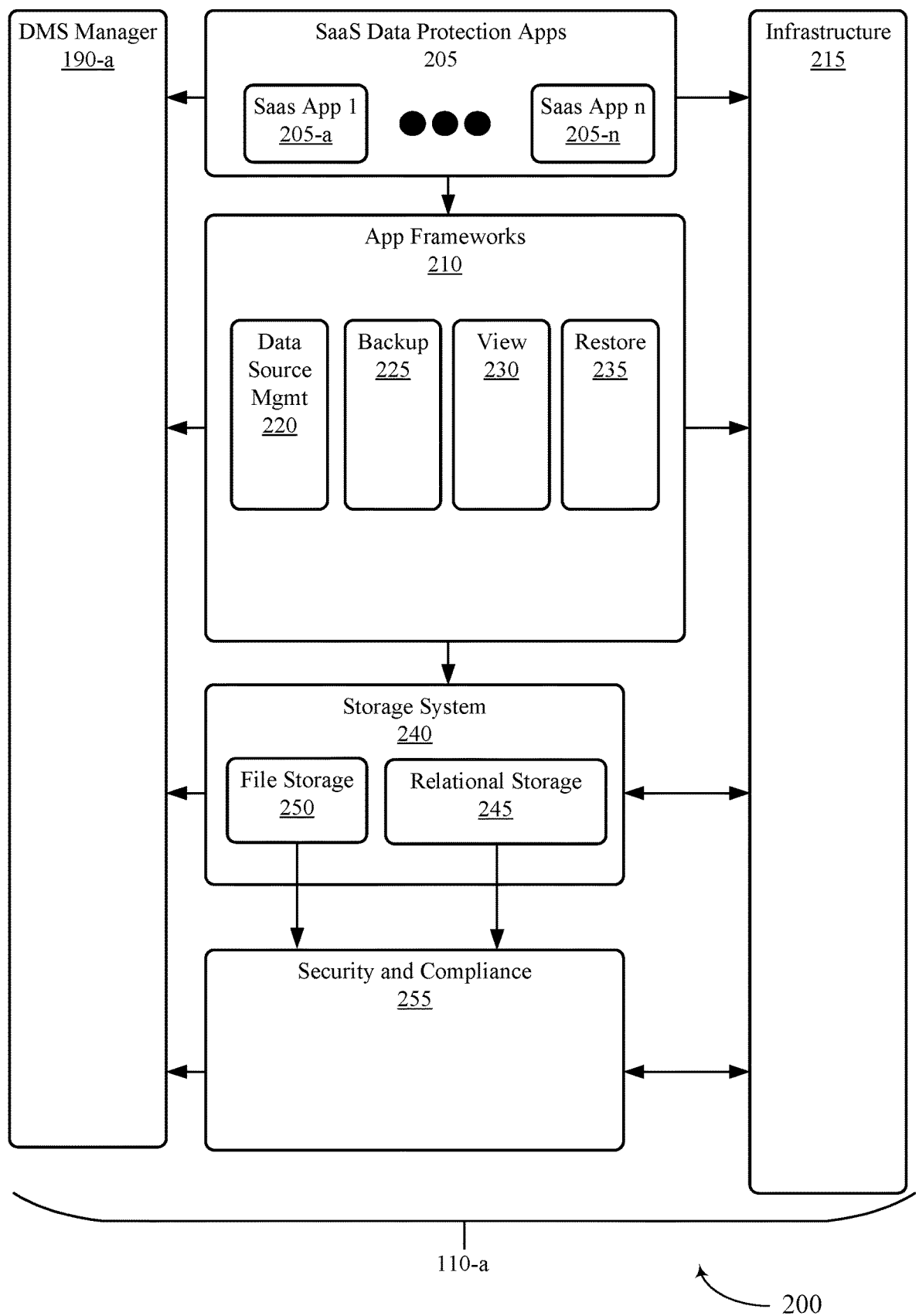
FIG. 2 shows an example of a data protection and recovery system that supports relational SaaS data protection in accordance with aspects of the present disclosure.

FIG. 2 shows an example of a data protection and recovery system 200 that supports relational SaaS data protection in accordance with aspects of the present disclosure. The data protection and recovery system 200 may implement or may be implemented by aspects of the computing environment 100. For example, the data protection and recovery system 200 may be implemented by a DMS 110-*a*, which may be an example of a DMS 110 as described herein.

The DMS 110-*a* may include a DMS manager 190-*a*, which may be an example of a DMS manager 190 as described herein. The DMS 110-*a* may support a generic framework that works for backup and restore of multiple relational SaaS applications. For example, the DMS 110-*a* may support multiple relational SaaS applications via including generic application frameworks 210 that may work with SaaS data protection applications 205 that are specific to different types of SaaS applications. An administrator of the DMS 110-*a* may specify a schema for a particular SaaS application and build connectors for the SaaS data protection applications 205 to the application frameworks 210, the DMS manager 190-*a*, and infrastructure 215 of the DMS 110-*a*. The infrastructure 215 may include data stores (e.g., storage nodes 185 as described with reference to FIG. 1), network connections to an external storage environment (e.g., the node clusters 196 at the cloud environment 195 as described with reference to FIG. 1), region support, availability management, fault tolerance, and client libraries.

As described herein, the DMS 110-*a* may include one or more SaaS data protection applications 205 configured to perform backup and recovery operations for different respective SaaS applications. For example, one SaaS data protection application 205 may be configured to perform backup and recovery operations for JIRA, and another SaaS data protection application 205 may be configured to perform backup and recovery operations for Salesforce. Each of the SaaS data protection applications 205 may include an application specific code and an application specific user interface (e.g., which may be displayed at a computing device 115 as described with reference to FIG. 1). A SaaS data protection application 205 may call one or more APIs for the associated SaaS application to retrieve data from the SaaS application for backup purposes or to send data to the SaaS application for restore purposes.

The application frameworks 210 may include common code shared across the one or more SaaS data protection applications 205. Application frameworks 210 may be realized via libraries, interfaces, or automated code generation. The application frameworks 210 may include a data source management framework 220, a backup framework 225, a view framework 230, and a restore framework 235.

Snapshots of the SaaS applications may be stored in the storage system 240. For example, the storage system may be one or more storage nodes 185 as described with reference to FIG. 1 or node clusters 196 at the cloud environment 195 as described with reference to FIG. 1. The storage system 240 may include a relational storage 245 to store relational data associated with relational SaaS applications and a file storage 250 to store data from non-relational SaaS applications or applications other than SaaS applications. For example, the relational storage 245 may be a SQL database. The application frameworks 210 may act as an orchestrating structure between the SaaS data protection applications 205 and the relational storage 245 for relational SaaS applications. For example, the application frameworks 210 may control data flow between the relational storage 245 and the SaaS data protection applications 205 (and the associated relational SaaS applications).

The DMS 110-*a* may include a security and compliance framework 255. For example, the security and compliance framework 255 may encrypt data in the storage system (e.g., using bring your own key (BYOK) or key rotation encryption techniques) or may monitor for compliance with encryption requirements. In some examples, the security and compliance framework 255 may include security applications, configurations or controls, such as internal access controls (e.g., for administrators of the DMS 110-*a*).

The view framework 230 may control a user interface (e.g., displayed at a computing device 115 as described with reference to FIG. 1) for the DMS 110-*a*. For example, an administrator of the DMS 110-*a* may control backup and recovery operations for the SaaS applications associated with the SaaS data protection applications 205 via a UI controlled by the view framework. The view framework 230 may implement role based access control (RBAC), may enable event creation or reporting associated with data protection or restoration for the SaaS applications associated with the SaaS data protection applications 205. The view framework 230 may display object hierarchies for SaaS applications at a user interface or may enable administrators to search or browse for data or the SaaS applications associated with the SaaS data protection applications 205.

The data source management framework 220 may include authentication framework (e.g., to access customer accounts at the SaaS applications). The data source management framework 220 may also include an API framework which may store which APIs are associated with each of the SaaS applications associated with the SaaS data protection applications 205. The API framework may control data rates (e.g., throttle data) retrieved or pushed through the APIs. The backup framework 225 may control backup operations for each of the SaaS applications associated with the SaaS data protection applications 205 (e.g., backup scheduling, skipping of items, failsafe, and resumability) in accordance with the data source management framework 220 or any instructions or commands received from the view framework 230. The restore framework 235 may control restore operations for each of the SaaS applications associated with the SaaS data protection applications 205 (e.g., restore scheduling, cascading restore, conflict resolution) in accordance with the data source management framework 220 or any instructions or commands received from the view framework 230.

The SaaS data protection applications 205 may enable automated discovery of objects for the associated SaaS applications. Each SaaS data protection application 205 may implement an interface which defines computing objects by calling source APIs.

The backup framework 225 may implement a data access object (DAO) interface which supports statically defined schemas and dynamically fetched schemas from the source SaaS application for each snapshot. As described with reference to FIG. 5, the backup framework 225 and the restore framework 235 may use the concept of logical entities to generalize backup and restore. Backup snapshots for relational SaaS applications may capture not only the data and metadata but also may capture changes in schemas of the tables of the relational SaaS applications.

The restore framework 235 may use a generic cascading search and restore to facilitate the restoration of dependencies in a relational SaaS application. The restore framework 235 may build a generic table graph with pre-defined schemas and relationships per application, which table graph may be pruned based on exclusions received from an administrator (e.g., via the view framework 230). The restore framework 235 may order restore operations based on an entity graph, where the entity graph may be based on the table graph. For example, as dependencies between computing objects and tables in relational Saas applications may determine the order in which computing objects and tables are restored, and the entity graphs may be used to determine the ordering. The entity graph may also be used to execute the actual restorations by calling restore functions which may be defined per entity. The restore framework 235 may include a task runner to run tasks associated with restore operations in a specified order. The restore framework 235 may include post processing functions which may perform tasks such as linking objects.

The SaaS data protection applications 205 and the application frameworks 210 may be agnostic to the way that the SaaS application vendors store data. The format in which data is stored in the relational storage 245 may depend on the APIs that are used to retrieve the data from the SaaS applications. For example, if a relational SaaS application completely changes its backend schema, but does not change its APIs, no changes would be implemented at the DMS 110-a (e.g., at the associated SaaS data protection applications 205 or the application frameworks 210) as the design of the DMS 110-a may not be directly dependent on the actual storage schema of the SaaS application vendor. The schema design for storage of backup data for relational SaaS applications may be based on the APIs input and output for a particular relational SaaS application. Thus absent API changes for a particular relational SaaS application, changes may not be made to the SaaS data protection applications 205 or the way that data is stored in the relational storage 245. If a relational SaaS application changes APIs, but fundamentals of the relational SaaS application remain the same, code changes may be made to the associated SaaS data protection applications 205 to account for the changed APIs (e.g., such changes may not involve large scale data transformation or schema migration for existing customers). Such avoidance of large scale changes may be achieved via the implementation of logical entities. For example, if APIs change for a relational SaaS application, the set of entities or the definition of entities may be changed accordingly (e.g., entities may be defined based on the APIs used to retrieve or restore tables). For example, the code for a SaaS data protection application 205 may be updated to reflect the tables or rows backed up or restored using the same APIs. If a relational SaaS application changes both APIs and the way that data is stored, depending on the change, the SaaS data protection applications 205 or the stored data for the relational SaaS application in the relational storage 245 may be changed. Such changes may involve schema migration for new incoming data.

Tables may be the lowest level of definition for a relational SaaS hierarchy which are directly stored into the relational storage 245. As used herein, the term "record" may refer to a row in a table. Tables may have relationships between each other that may be stored as metadata in the relational storage 245. Table relationships may be used during cascading restores or ordering for backup or restore. Table relationships for a computing object may change across snapshots (e.g., the relational storage 245 may provide write and read APIs for relationship changes across snapshots. Table relationships may be similar to foreign key relationships in databases. The table relationship may be between a primary key of one table A (referred to as a parent table) and any column of another table B (referred to as the child table). The column in table B may store an indication of the primary key directly (e.g., as a single key) or may store indications of multiple primary keys into table A (e.g., as an array which point to multiple parents) to allow for multiple cascading. Hence, different types of relationships may be pre-defined in code. Relationships between tables for a relational Saas application may be defined by an associated SaaS data protection application 205 and stored in the relational storage 245. For example, Table 1 below shows an example relationship structure for relational tables.

TABLE 1

```
type Relationship struct {
    ChildTableName string
    ChildColumnName string
    Type RelationshipType
    ParentTableName string
    ParentColumnName string
    Metadata byte[ ]
}
type MetadataProto struct {
    cascadeToParent bool,
    cascadeToChild bool,
}
```

Table schemas may be encoded in the relational storage 245. Schemas may be changed across snapshots (e.g., columns may be added, deleted, or renamed) on the fly during an initial phase of a backup of any snapshot. For example, any table may be defined by a type DAO interface which retrieves the unique name of the table (e.g., via a tablename( ) function) and retrieves the set of all dependency relationships for the table (e.g., via a GetDependency Relationships( ) function).

Tables may be static or dynamic. Static tables may be encoded into the backup framework 225 or the SaaS data protection applications 205 for a particular SaaS application. The source APIs may not create or change static tables. Static tables may generally be tables that are application specific. The schema for a static table may be mutated via a code change. If the schema of a static table is changed and deployed into production, the next snapshot will change the schema of that table in the relational storage 245 on the fly (e.g., during the backup).

Dynamic tables may generally be used for custom tables in the source side which are not application specific but customer or snapshot specific. Schemas of dynamic tables may be fetched on the go (e.g., during the backup) and persisted into the relational storage 245.

The schema of static tables may be encoded in golang DAO structs. For example, each table schema may be stored in DAO structs in .go files. There may be one DAO struct for each table which indicates the table's SQL type and other information embedded into struct attributes. Golang reflections may be used to extract additional information to form the table SQL schema. Such DAO structs may also serve as objects to store table rows in a strongly typed manner. For example, a static DAO interface may be given by: type StaticDAO interface {DAO}. Table 2 below shows an example static DAO struct.

TABLE 2

```
type IssueCommentDao struct {
    ID            string    'ColumnID:  "1"  DB:"varchar(20)" Index:key'
    IssueID       int       'ColumnID:  "2"  Index:true'
    IssueKey      string    'ColumnID:  "3"  DB:"varchar(20)"'
    CreateUserID  string    'ColumnID:  "4"  DB:"varchar(10)" Index:true'
    Body          string    'ColumnID:  "5"  DB:"json"'
    UpdatedUserID string    'ColumnID:  "6"  DB:"varchar(10)"'
    CreatedTime   int       'ColumnID:  "7"'
    UpdatedTime   int       'ColumnID:  "8"'
    JSDPublic     bool      'ColumnID:  "9"'
}
```

In some examples, the columnID field may be mandatory and may be used to detect column renames and type changes. Reflections may automatically interpret the SQL type from corresponding golang types (e.g., "int" for integer, "bool" for Boolean). In some examples, complex types such as varchar and json may be specified using the "SQL" tag. A field may generally not be removed from the DAO struct once added unless that field in not used during restore operations at all, as upon removal, that field may no longer be filled during reads from the datastore. The static DAO struct may be used in schema backup, data backup, search, and restore. The structure of the static DAO struct may first be used during the schema backup, and the API objects may be used at a later time to fill in the DAOs.

Dynamic tables may be used when the full table schema or schema modifications are not known before a backup job and may be fetched from the source SaaS application using APIs during backup. Some SaaS applications, such as JIRA, may not use dynamic tables. A dynamic DAO interface may be given by: type DynamicDAO interface {implement DAO interface}. Dynamic tables may be mapped during runtime of a backup operation based on the objects provided from a SaaS application via APIs.

Figure 3:
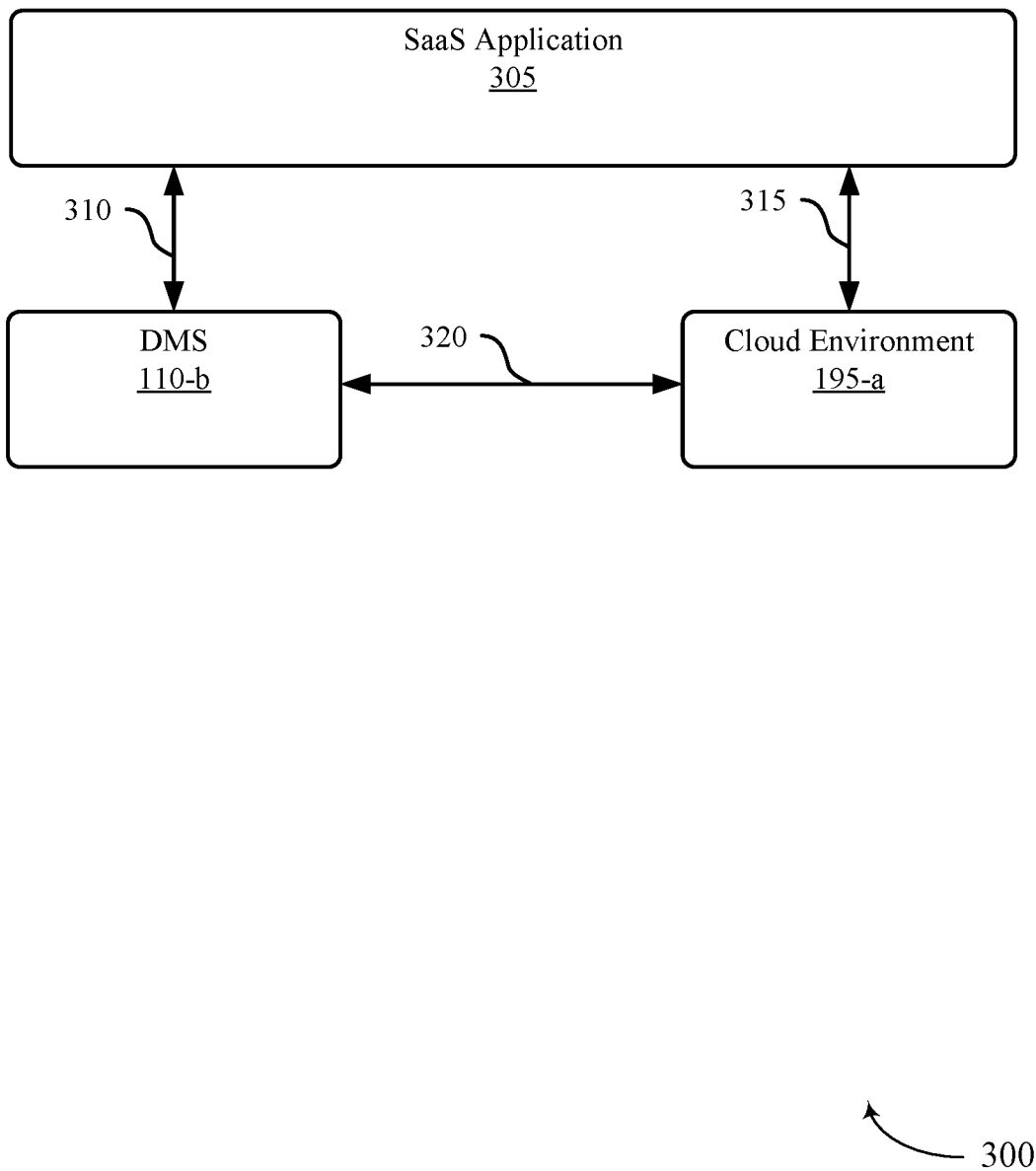
FIG. 3 shows an example of a computing environment that supports relational SaaS data protection in accordance with aspects of the present disclosure.

FIG. 3 shows an example of a computing environment 300 that supports relational SaaS data protection in accordance with aspects of the present disclosure. The computing environment 300 may implement or may be implemented by aspects of the computing environment 100 or the data protection and recovery system 200. For example, the computing environment 300 may include a DMS 110-*b*, which may be an example of a DMS 110 as described herein. As another example, the computing environment 300 may include a cloud environment 195-*a*, which may be an example of a cloud environment 195 as described herein. For example, the cloud environment 195-*a* may be a Microsoft Azure cloud computing platform.

A SaaS application 305 may be hosted in a distributed environment (e.g., a first storage environment). The DMS 110-*b* may retrieve information stored at the SaaS application via a set of APIs 310 (e.g., REST APIs). The DMS 110-*b* may communicate via a network connection 320 with the cloud environment 195-*a*. In some examples, the DMS 110-*b* may transfer snapshots from the DMS 110-*b* to the cloud environment 195-*a* (e.g., a second storage environment) via the network connection 320. In some examples, based on a command from the DMS 110-*b*, the cloud environment 195-*a* may retrieve information stored at the SaaS application via a set of APIs 315 (e.g., REST APIs).

Similarly, for restore functions, in some examples, the DMS 110-*b* may retrieve snapshots from the cloud environment 195-*a* via the network connection and may restore the snapshots to the SaaS application 305 via the set of APIs 310. In other examples, for restore functions, the DMS 110-*b* may send a command to the cloud environment 195-*a* indicating the snapshots to restore, and the cloud environment 195-*a* may restore the indicated snapshots to the SaaS application 305 via the set of APIs 315.

For an organization that is a customer of a SaaS application, the organization may be represented as a set of computing objects (e.g., snappables) in a hierarchy. The computing objects may be defined for that SaaS application through an interface (e.g., at the corresponding SaaS data protection application 205 as described with reference to FIG. 2), and once defined, the application framework 210 as described with reference to FIG. 2 for the DMS 110-*b* may add new objects, remove or archive old objects, and update existing objects. For example, upon initial backup of a SaaS application for an organization, the DMS 110-*b* may use a discovery job to determine the computing objects within the SaaS application for that organization via calling the set of APIs 310 associated with the SaaS application. The DMS 110-*b* may use a refresh job to update the set of active computing objects (e.g., snappables) in an organization or site by making API calls via the set of APIs 310 and updating the hierarchy in the database (e.g., the relational storage 245 as described with reference to FIG. 2).

For example, discovery interfaces that may be implemented by the DMS 110-*b* may include: 1) GetNextBatch( ) which queries the next page of APU results and returns a managed object batch with contains all details of that managed computing object: 2) GetManagedObjectType( ) which indicates the managed object type that the object iterator handles; and 3) Close (taskUpdater,tcConfig) which may be called when the DMS 110-*b* has completed iterating the batches. Any custom tasks for a SaaS workflow may be added after the GetManagedObjectType( ) interface (e.g., to write any bookkeeping done during the batch retrieval to the task configuration for subsequent tasks to utilize). In some examples, the DMS 110-*b* may perform a refresh job periodically. For example, every X duration, the DMS 110-*b* may fetch all of the computing objects associated with an organization or site for a SaaS application and identify the differences between the new set of computing objects and the last set of computing objects for the organization or site for the SaaS application to discover and archive the current set of computing objects.

Figure 4:
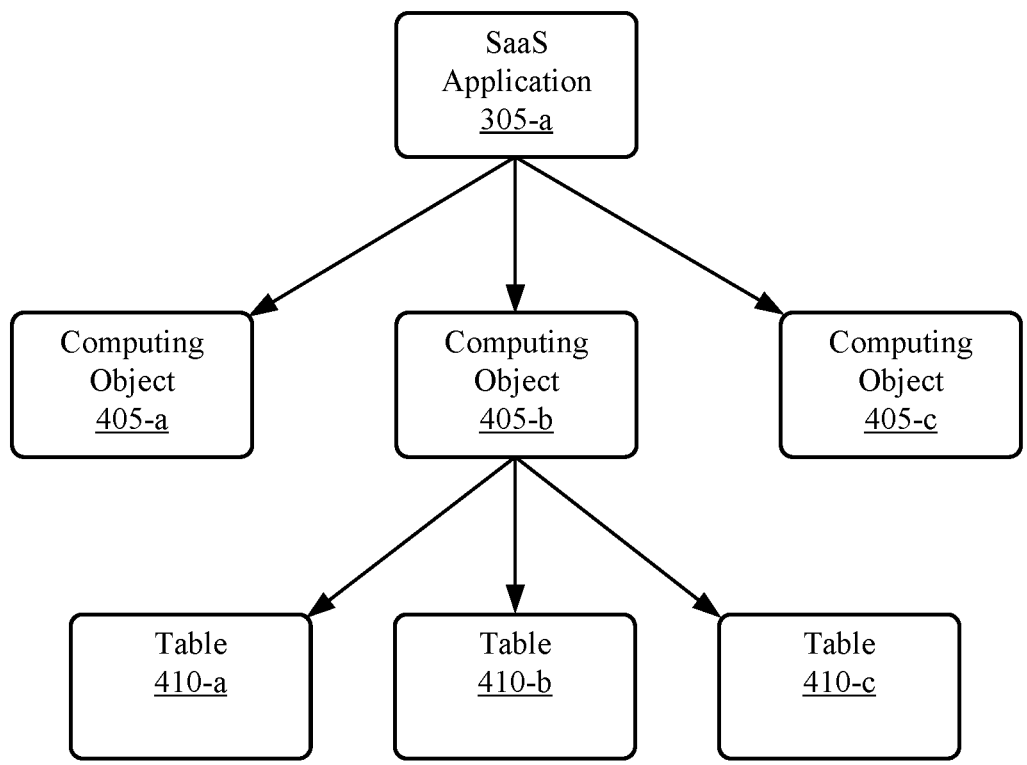
FIG. 4 shows an example of a hierarchical diagram of a SaaS application that supports relational SaaS data protection in accordance with aspects of the present disclosure.

FIG. 4 shows an example of a hierarchical diagram of a SaaS application 400 that supports relational SaaS data protection in accordance with aspects of the present disclosure. The hierarchical diagram of a SaaS application 400 may implement or may be implemented by aspects of the computing environment 100, the data protection and recovery system 200, or the computing environment 300.

Each SaaS application 305-a includes a set of computing objects 405 (e.g., a computing object 405-a, a computing object 405-b, and a computing object 405-c) as shown. Each computing object 405 may involve a separate restore job and a separate backup job. At backup side (e.g., in the relational storage 245 described with reference to FIG. 2), each computing object may store data in multiple tables. Each computing object 405 may include a set of tables 410. For example, the data of the computing object 405-b may be stored in a table 410-a, a table 410-b, and a table 410-c. Table design at a high level may depend on multiple factors. For example, such factors may include the logical entities of the SaaS application, the REST APIs of the SaaS application, deduplication (e.g., bulky contents that do not change often may be split into separate tables by design, such as an issue comments table and an issues table), and the static or dynamic nature of tables in the application. For example, Salesforce may add custom tables across snapshots.

There may be a many: many (many to many) relationship between restore or backup APIs and tables 410. Accordingly, multiple tables may be backed up or restored via a single API, which may complicate generalization of backup and restore jobs as the interfaces may be independently implemented at the snappable level. Accordingly a DMS 110 may implement a logical restore unit and a logical storage unit, where a logical restore unit may be referred to as a logical entity.

Figure 5:
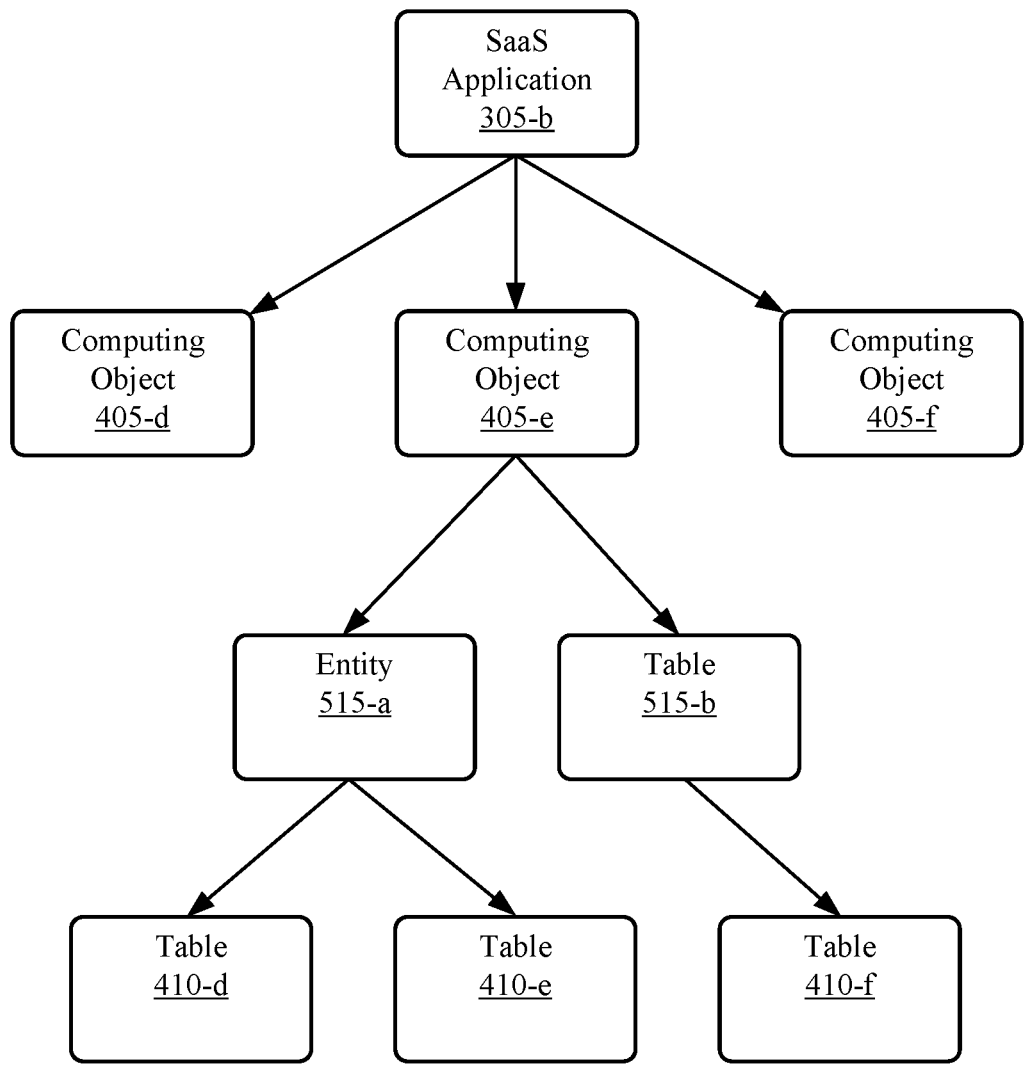
FIG. 5 shows an example of a hierarchical diagram of a SaaS application that supports relational SaaS data protection in accordance with aspects of the present disclosure.

FIG. 5 shows an example of a hierarchical diagram of a SaaS application 500 that supports relational SaaS data protection in accordance with aspects of the present disclosure. The hierarchical diagram of a SaaS application 500 may implement or may be implemented by aspects of the computing environment 100, the data protection and recovery system 200, the computing environment 300, or the hierarchical diagram of a SaaS application 400.

As described herein, each SaaS application 305-b includes a set of computing objects 405 (e.g., a computing object 405-d, a computing object 405-e, and a computing object 405-f) as shown. Each computing object 405 may include a set of tables 410. For example, the data of the computing object 405-e may be stored in a table 410-d, a table 410-e, and a table 410-f. As described above, to simplify backup and restore operations for relational SaaS applications, tables 410 may be grouped into logical entities 515, where a logical entity includes a group of tables 410 associated with a same set of APIs for backup or restore operations. For example, the table 410-d and the table 410-e may be included in the first entity 515-a and the table 410-f may be included in the second entity 515-b.

An entity 515 may be a single unit for backup or restoration operations. An entity 515 may be a group of tables 410 which are associated with a same source API (or same set of source APIs) via which the DMS 110 performs backup or restoration operations for the SaaS application. For example, in JIRA, "Issues" may be an entity which contains IssueMetadata, IssueData, IssueComment, and IssueAttachment tables. For example, all tables 410 which are restored via the same API may below to the same entity 515. One computing object or snappable may have multiple entities 515, and each entity 515 may have multiple tables. Each entity 515 has at least one table. Table relationships may be within any two tables, within an entity 515, or across entities 515. There may be no restriction on the kinds of relationships within tables of the same entity. An entity may be defined as: Entity: List [Tables]. The concept of an entity allows the DMS 110 to generalize jobs for every new SaaS application by implementing interfaces at an entity level. Table 3 shows an example entity interface. The functions GetBackupRecordsBatchIterator( ) and RestoreRecordsBatch( ) are defined below.

TABLE 3

```
type Entity interface {
    // Unique identifier for the entity across a particular SaaS app.
    func EntityName( ) string
    // Latest set of DAOs for all the tables in this entity
    func GetDAOs( ) [ ]*DAO
    // Returns true if this entity supports incremental ingest
    func SupportsIncrementalIngest( ) bool
    func GetBackupRecordsBatchIterator(
        snapshotNum int,
        syncToken string,
        commitToken string,
    ) *BackupRecordsBatchIterator, error
    func RestoreRecordsBatch(
        iterator *PrimaryKeyIterator,
        restoreRunner RestoreTaskRunner,
        location *RestoreLocation
    ) error
}
```

As entities are collections of tables, entities may support both static and dynamic tables. A single entity may be static or dynamic. For example, a single entity may include static tables or may include dynamic tables. In some examples, a single entity may not include both static and dynamic tables.

As described herein, in JIRA, the "Issues" may be an entity which contains IssueMetadata, IssueData, IssueComment, and IssueAttachment tables An example table schema of a project (e.g., Issues) snappable in JIRA may be represented as the list of DAO objects in code returned from the GetDAOs( ) function as: [ ] StaticDao {& IssureMetaData { }, &IssueData { }, &IssueComment { }, &IssueAttachment { }, & Project{ } }.

Each snappable or computing object 405 may be a set of entities 515. When building a new application (e.g., a SaaS data protection application 205 for a new SaaS application to backup as described with reference to FIG. 2), the DMS 110 may first determine the hierarchy of computing objects 405 within the SaaS application. The DMS 110 may identify the entities of each computing object 405 and the tables 410 within each entity 515 along with the table schemas. The DMS 110 may first determine the DAOs, followed by entity implementation. The DMS 110 may use a SaasSnappable interface to specify the entities in a current computing object 405, where an example of the SaasSnappable interface is shown in Table 4.

TABLE 4

```
type SaasSnappable interface {
    // Returns the latest set of entities of this snappable.
    func GetEntities( ) [ ]*Entity
}
```

The SaasSnappable interface may support both static and dynamic entities 515. For example, in Atlassian, each of the entities may be static (e.g., include only static tables) and the list of entities may depend on the type of the computing object 405. For a dynamic computing object, for example, as in some Salesforce computing objects, a list of specific entities may be returned based on the configuration of the computing object.

In some examples, the DMS 110 may split tables 410 into multiple tables to assist with deduplication. For example, an Issue table in JIRA may be split into separate IssueMetadata, IssueComments, and IssueAttachments tables.

Relationships may denote cascading and ordering for restore operations. Relationship information may be added to cascade from one table to another. Relationship information may not be added for foreign key mapping. For example, there may be no reason for cascading or ordering to add relationship information between an IssueMetadata table and an IssueComments table in JIRA as these tables may not have parent-child relationships between them, though they may share a same parent. In some examples, table relationship directed graphs (e.g., from parent to child) may not have loops, except for self-loops. In some examples, entity relationship directed graphs (e.g., from parent to child) may not have loops, except for self-loops. In some examples, the DMS 110 may run a periodic validator job or operation may per organization (e.g., customer of a SaaS application) to validate such constraints across snappables or computing objects for that organization.

As described with reference to FIG. 2, the backup framework 225 may be a generic backup taskchain for all relational SaaS computing objects which have a common implementation built on top of the entities defined per SaaS computing object. The data backup phase performed by the backup framework 225 may be divided into two parts: 1) schema backup; and 2) data backup.

The schema backup phase may make any modifications to the schema (e.g., the schema and the outgoing references) of the tables for each entity. A temporally first snapshot of a particular computing object may create the table(s) in the computing object and may initialize the outgoing references (e.g., references to parent tables and child tables). The schema backup phase may be performed for subsequent snapshots of a computing object if there are modifications to one or more tables in the computing object. The schema backup phase may iterate over all of the entities in a computing object and may retrieve the latest DAOs of all of the tables in each entity to check if the schema has changed since the last snapshot. Once the schema backup phase is complete, the DMS 110-a may store a synchronization token to store the place of the backup operation. The DMS 110-a may synchronize the schemas in the relational storage 245 based on the scheme backup phase (e.g., using a synchronization token).

The data backup phase may be performed after the schema backup phase. In the data backup phase, data may be fetched or retrieved from the source SaaS application and written into the relational storage 245 in the identified schema format (e.g., identified in the schema backup phase). The data backup phase involves fetching or retrieving relevant data from APIs, transforming the data into DAO objects, and ingesting the DAOs into the datastore (e.g., the relational storage 245). For example, the backup of one page of API objects may be split into the following stages: 1) fetch a page of API objects: 2) convert the page to DAO objects; and 3) ingest the DAO objects into datastore (e.g., the relational storage 245). The first and second stages may be specific to each snappable type and may be defined by the entity interface. The third stage may be generalized across entities.

For relational SaaS applications, the third stage may be generalized by iterating over all the entities in each computing object. Each entity may have its own backup function which may provide the records for all of the tables included in the entity. The order of entities to backup may be important to avoid conflicts during restoration operations as entities may be interrelated. For example, a child entity may be backed up before a parent entity to minimize conflicts (e.g., as additions of child objects may be more common than deletions). The ordering of tables within an entity may be handled within the entity definition.

The BackupRecordsBatchIterator interface described above in Table 3 may define a function to fetch records of an entity in batches to backup. The BackupRecordsBatchIterator interface may hold next page information and may specify whether to synchronize or commit each table in the entity. Each entity may have its own implementation of the BackupRecordsBatchIterator interface. An example of the BackupRecordsBatchIterator interface is provided in table 5, where each entity has its own BackupRecordsBatchIterator interface.

TABLE 5

```
type BackupRecordsBatchIterator interface {
    Next( ) [ ]DAO
    ShouldSync( ) (bool, SyncTokenString)
}
Entity {
    GetBackupRecordsBatchIterator(
    snapshotNum int,
    syncToken string,
    commitToken string,
    ) BackupRecordsBatchIterator
}
```

As shown in table 5, the per entity BackupRecordsBatchIterator interface method may be used to define the first and second stages of the data backup by fetching all records of the tables in the given entity in a paginated way and converting the fetched records into the table DAOs. A common backup function may handle iterating through the entities and ingesting DAOs into the relational storage, and in some examples, along with resiliency and resumability requirements. For example, a function RelationalSaasSnapshotRunnerImpl may fetch entities to backup first, and then may proceed to backup each entity individually (e.g., in the relational storage). Each entity backup phase may involve schema backup and data backup, as described herein. A snapshot runner may track which backups of which entities have been completed for resumability purposes. For example, the DMS 110-a may use synchronization tokens for resumability purposes (e.g., after each entity is complete or within an entity after every X records, where X may be an entity level decision). Synchronization tokens may have details encoded which indicate which entities have been completely or partially backed up, and if partially backed up, up until which point. Table 6 shows an example of a RelationalSaasSnapshotRunnerImpl function.

TABLE 6

```
type RelationalSaaSSnapshotRunnerImpl struct {
    func Run(
    exoConfig,
    snappableAdapter,
```

TABLE 6-continued

```
    snapshotResultChannel)
  error {
    entities = snappableAdapter.GetEntities( )
    // Backup Schema
    EntitySchemaBackupRunner(entities, snapshotNum).Run( )
    // Entities backup needs to be ordered. We backup child first and then
    parents to minimize conflicts (assumption - addition of entries at the
    source is more common than deletes).
    orderedEntities =
    OrderEntitiesBasedOnSchemaRelationships(entities)
    // Backup data
    for entity:= range orderedEntities {
      EntityDataBackupRunner(entity).Backup(snapshotNum)
      // Sync at the end of every entity
      Zeus.Sync(syncToken)
    }
  }
}
type EntityDataBackupRunner struct {
  EntityAdapter *Entity
  SnappableID UUID
  // Backup performs a new backup of the entity.
  Backup(snapshotNum int) {
    snapWriter = NewZeusSnapshotWriter(SnappableID, snapshotNum)
    prevCommitToken = ' '
    if SupportsIncrementalIngest && snapshotNum > 1 {
      prevCommitToken = FetchPreviousSnapCommitToken( )
    }
    prevSyncToken = FetchLatestSyncTokenInCurrSnapshot( )
    it = EntityAdapter.GetBackupRecordsBatchIterator(
      snapshotNum, prevSyncToken, prevCommitToken)
    for {
      shouldSync, syncToken = it.ShouldSync( )
      if shouldSync {
        snapWriter.Sync(syncToken)
      }
      recordsBatch = it.Next( )
      IngestRecordsToZeusWithDedupe(recordsBatch)
    }
    if !EntityAdapter.SupportsIncrementalIngest( ) {
      HandleAlwaysFullDeletes( )
    }
    snapWriter.Commit(commitToken)
  }
}
```

The backup framework 225 may also be responsible for handling skipping items in tables or entities (e.g., based on errors), retries based on errors in the relational storage 245, and fail safe full requests.

The restore framework 235 may control restore operations for each SaaS application. The view framework 230 may enable browse and search functions on a user interface. For example, browse and search functions may enable an administrator of the DMS 110-a to narrow down relevant records or to restore to a particular destination. The browse and search functions may be interactive.

Relational SaaS computing objects may have cascading demands, meaning that a selection to restore one table or computing object for a customer or organization may result in a number of other restores via cascading. Cascading may be dependent on a number of factors such as snappable type, relationships between tables, and customer selected options.

The view framework 230 may provide an application specific user interface to customers to select rows to restore along with the snapshot from which to restore (e.g., which point in time). The user interface may also provide customization options that may drive the cascading criteria. The cascading effects of a particular selection may be shown to the customer or administrator on the user interface, and the customer or administrator may be allowed to select or deselect cascading effects to restore.

Once the customer or administrator makes a final selection of items to restore, that information may be sent to the restore framework 235 for a restore job. Cascading may be based on the tables stored in the relational storage 245 for the given SaaS application and may be determined based on entity relationships. Actual restorations may occur on an entity basis.

A table graph may be a graph where each node is a table and edges are parent-child relationships between the tables. Except for self-loops, table graphs may not have any cycles (e.g., dependency loops). The view framework 230 may compute a table graph for selected tables, and the displayed cascading effect may be based on the table graph. Example functions TableVertex and TableGraph may be used to generate a table graph as shown in Table 7.

TABLE 7

```
    type TableVertex struct {
      tableName string
      keysToRestore PrimaryKeyIterator
      // If false, we have not yet cascaded from this node.
      hasCascaded bool
      children [ ]*TableVertex
      parents [ ]*TableVertex
    }
    type TableGraph struct {
      // mapping of snappable id. to snapshot num.
      snapshotNums map<string>int
      vertices [ ]*TableVertex
    }
```

An entity graph may be a graph where each node is an entity and edges are parent-child relationships between the entities. Except for self-loops, entity graphs may not have any cycles (e.g., dependency loops). A restoration job may compute an entity graph for selected tables. Entity graphs may be constructed using table graphs, where all the tables which belong to the same entity are grouped together into a single node. The child-parent reference from one entity to another may be indicated if there is any child-parent reference from any table of any entity to any other table of another entity. Example functions EntityVertex and EntityGraph may be used to generate an entity graph as shown in Table 8.

TABLE 8

```
    type EntityVertex struct {
      entityName string
      keysToRestore PrimaryKeyIterator
      children [ ]*EntityVertex
      parents [ ]*EntityVertex
    }
    type EntityGraph struct {
      // mapping of snappable id. to snapshot num.
      snapshotNums map<string>int
      vertices [ ]*EntityVertex
    }
```

The DMS 110-a may implement a generic algorithm for cascading search that may be applied to all SaaS computing objects. As the table relationship information is encoded in the relational storage 245, the relationships may be traced recursively to find cascading effects for a user to select. The starting point for cascading may be the keys (e.g., tables) that a customer or administrator has requested to restore (e.g., via a user interface), which may result in a table graph. The table graph may be passed on to a restore job at the restore framework 235. The inputs for cascading may be the keys to restore (e.g., a primary key iterator which may generally be within a single table) and cascading criteria. In some examples, the cascading criteria may include which relationships to traverse for every node (e.g., in some cases parent relationships may be traversed and in some cases just child relationships may be traversed) which may be provided by the function Entity. CascadingTypes( ) for each entity. In some examples, the cascading criteria may include any exclusions that the customer or administrator defined in the user interface (e.g., which tables not to restore).

Cascading by the view framework 230 may involve creation of a lazy table graph where nodes are tables and the keys to restore in the tables and edges are relationships between the tables based on the cascading criteria. The view framework 230 may perform a breadth-first search (BFS) to identify the keys to restore for every table. The table graph may be referred to as a lazy table graph because the BFS may not be a complete BFS, but may only be completed to show options to the customer or administrator on the user interface. For example, only the tables shown on the interface may be shown and not the entirety of the chain of dependencies. A full cascade of the dependencies may be performed by the restore job based on a selection by the customer or administrator on the user interface of the user tables to restore. The table dependencies may be in different computing objects. For example, a table in one computing object may be a child of a table in another computing object. In some cases, snapshots of the different computing objects may occur at different times. and in such cases where a selected table in a first computing object depends on a table in a second computing object, the DMS 110-*a* may select for cascading the table in the snapshot of the second computing object that is closest in time to the selected snapshot of the first computing object. Table 9 shows an example of an ExclusionInterface function and a CascadingSearch function which may be used by the view framework 230 to display tables in a hierarchical relationship with a selected table.

TABLE 9

```
type ExclusionInterface interface {
    ShouldExclude(entityName string) bool
}
// Generic library function
func CascadingSearch(
    snappableId string,
    // Keys selected per table
    customerSelectedKeys map[string]PrimaryKeyIterator,
    exclusions ExclusionsInterface) TableGraph {
}
```

Once the view framework 230 has the cascading results, the summary page may be displayed to a customer or administrator who may select or deselect some of the keys to restore. The table graph may be pruned based on the selections from the administrator before being sent to the restore framework 235.

The restore framework 235 may be a generic restore taskchain that may operate with any relational SaaS snappable which has a common implementation built on top of entities defined per SaaS snappable. A restore operation may be a granular restore, a partial restore, or a full restore.

A granular restore may originate from a search or browse function provided by the view framework 230. In a granular restore, the DMS 110-*a* may be provided the exact keys that the customer or administrator selects to restore and then performs a cascade operation to retrieve additional keys from other tables in hierarchical relationships with the selected tables (e.g., keys). For example, the lazy table graph may be provided by the view framework 230, and as part of the restore framework 235, the DMS 110-*a* may construct an entire table graph (e.g., using a BFS) in memory and may convert the entire table graph into an entity graph, which may be used to perform the restoration.

A partial restore may be similar to a granular restore except the volume of information may be higher. For example, a partial restore may involve one or more selected computing objects (e.g., in JIRA, one or more projects). For example, a partial restore may involve restoration of a logical component of an application. In a partial restore, the DMS 110-*a* may be provided partial restore nodes via a table graph and creates a full table graph which may then be converted into an entity graph which may be used to perform the restoration. The keyiterator of the DMS 110-*a* may not have sufficient memory to construct the entire table graph, and accordingly the keyiterator may fetch data lazily (e.g., as needed) in a paginated form.

A full or bulk restore may involve restoring an entire SaaS application for an organization or customer of the SaaS application. A full restore may not involve cascading as each computing object and table may be restored. Full restores may involve ordering. A full restore may involve the DMS 110-*a* creating an entity graph by adding relationships to all of the entities and restoring the entities using the entity graph in an ordered fashion (e.g., parent before child). For full or bulk restores, the fundamental logic may be similar to granular and partial restores, but more parallelism may be involved.

Restore operations may involve a stitching operation. For example, when a record is restored from the relational storage to the SaaS application, the SaaS application may generate a new primary key for the record. For example, when a deleted issue is restored in JIRA, JIRA may create a new Issue ID for the restored Issue. In such a case, when the dependents of the record are also restored (for example, parent issues), the restore job performed by the DMS 110-*a* may stitch back the dependency at the SaaS application with the new ID and not the original ID of the restored record, which process may be referred to as stitching. The scope of the stitching operation may be limited to the restore process. For example, assuming a 100 bytes per key, 1 million entries may use around 200 MB of memory, thus the stitcher may be implemented in memory. In some examples, the stitcher may be implemented in a disk store.

Restore operations may involve other post processing operations based on the new mapping of IDs after the restore of individual records to the SaaS application are completed. For example, functions that may be called include: a Stitcher interface which replaces old keys with new keys: a function that restores each node in an entity graph in BFS order (e.g., using an Entity. RestoreRecords function): a function that keeps a map of all restored table IDs and passes the map onto the next node: an entity handle function (EntityHandler.Restore) that may return post processing steps which may be called at the end. Restoring all records in an entity may also involve ordering records within the entity if a table has a self-reference.

Additionally, restore operations may involve conflict or dependency resolution operations. Backups or snapshots may not be 100% consistent as there may not be a single API which fetches all entries in a SaaS application at a particular time (e.g., backup operations may occur over a duration of time and may not be instantaneous). Dependencies may be across computing objects, and snapshots of computing objects may occur at different points in time, so it is possible that a dependency of a row in a snapshot of a different computing object may not exist. Such issues may be resolved through a conflict resolution process and may be performed at the end of a restore operation. If a relationship is from one computing object A to another computing object B and the restore operation restores rows from snapshot SI of computing object A, then the DMS 110-*a* may select the snapshot of the computing object B that is closest to the timestamp of SI for any dependencies in the computing object B to restore. This snapshot of computing object B may then be used to read the corresponding entries in the dependency. If the dependency was broken, then there may be a partial restore where some links have not been restored. Information regarding broken dependencies may be provided to a customer or administrator through restore events (e.g., via a user interface).

Figure 6:
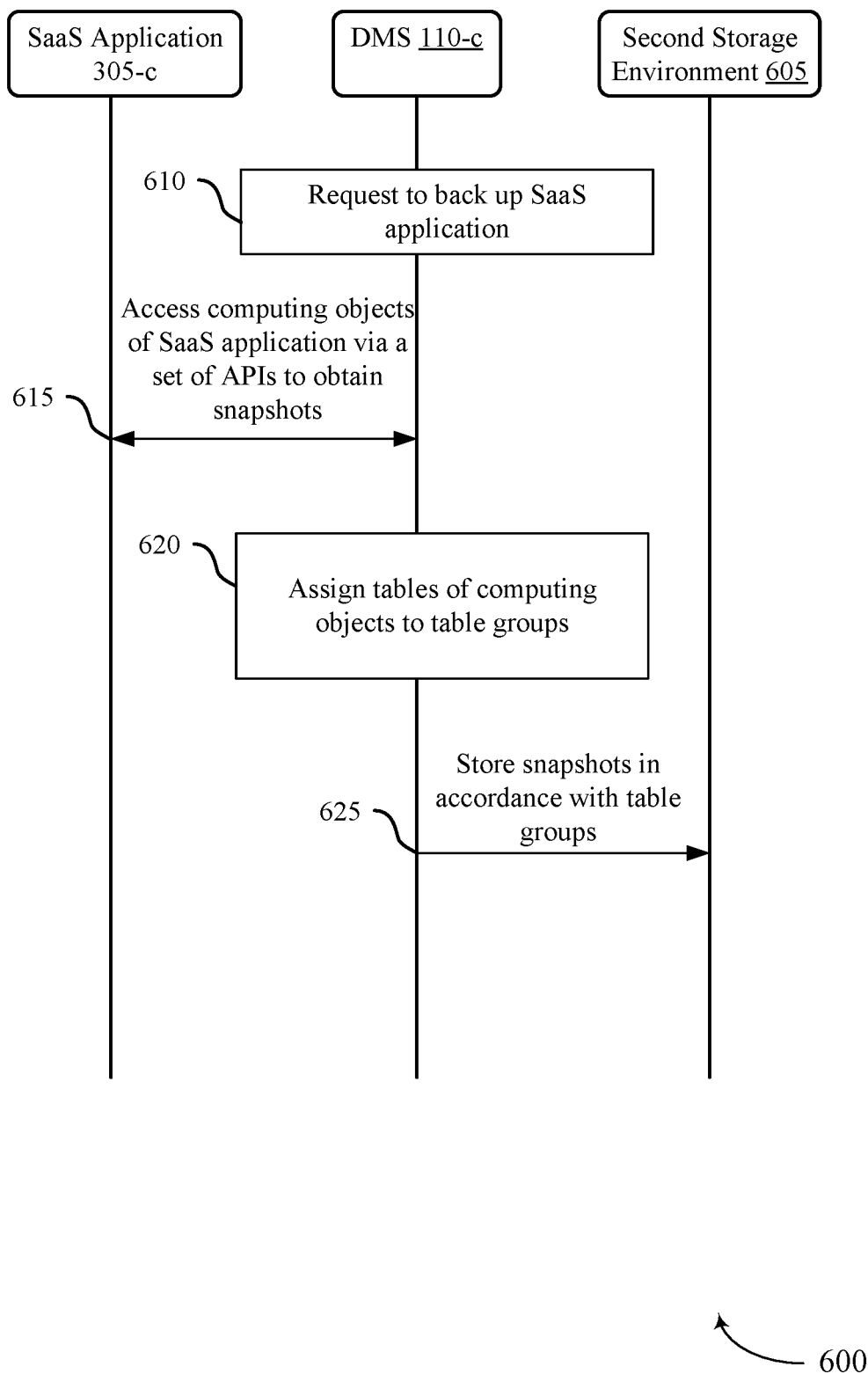
FIG. 6 shows an example of a process flow that supports relational SaaS data protection in accordance with aspects of the present disclosure.

FIG. 6 shows an example of a process flow 600 that supports relational SaaS data protection in accordance with aspects of the present disclosure. The process flow 600 may implement or may implement aspects of the computing environment 100, the data protection and recovery system 200, the computing environment 300, the hierarchical diagram of a SaaS application 400, or the hierarchical diagram of a SaaS application 500. For example, the process flow includes a DMS 110-*c* which may be an example of a DMS 110 as described herein and a SaaS application 305-*c* which may be an example of a SaaS application 305 as described herein. For example, the SaaS application may be hosted at a first storage environment (e.g., a distributed cloud environment). The process flow may include a second storage environment 605, which may be an example of one or more storage nodes 185, one or more node clusters 196 at a cloud environment 195, or a relational storage 245 as described herein. In the following description of the process flow 600, operations between the Saas application 305-*c*, the DMS 110-*c*, and the second storage environment 605 may be added, omitted, or performed in a different order (with respect to the exemplary order shown).

At 610, the DMS 110-*c* may receive a request to back up a SaaS application that includes a set of computing objects. Computing objects within the set of computing objects may include respective sets of tables having respective hierarchical relationships. In some examples, the DMS 110-*c* may receive the request from a computing device associated with a user account of the DMS 110-*c*. In some examples, receiving the request at 610 may include identifying that a time for a scheduled backup operation for the SaaS application has been satisfied (e.g., for a periodic backup).

At 615, the DMS 110-*c* may access, based on the request and via a set of APIs for the first storage environment associated with the SaaS application, the set of computing objects to obtain snapshots of the computing objects within the set of computing objects.

At 620, the DMS 110-*c* may assign tables within the respective sets of tables to respective table groups. A table group may include one or more tables associated with a same group of one or more APIs from among the set of APIs.

At 625, the DMS 110-*c* may store the snapshots of the computing objects and information regarding the respective hierarchical relationships in the second storage environment 605 associated with the DMS 110-*c*. The snapshots may include the respective sets of tables and within the second storage environment 605, the respective sets of tables may be stored in accordance with the assigned respective table group.

In some examples, the DMS 110-*c* may identify, at a first time and using the set of APIs, computing objects within the set of computing objects and a first hierarchical relationship of the set of computing objects, and the accessing at 615, the assigning at 620, and the storing at 625 may be based on identification of the set of computing objects and the first hierarchical relationship. In some examples, the DMS 110-*c* may identify, at a second time and via the set of APIs, an update to the computing objects within the set of computing objects and a second hierarchical relationship of the set of computing objects. In some examples, the DMS 110-*c* may periodically update the computing objects within the set of computing objects and the hierarchical relationship of the set of computing objects.

In some examples, a first set of table groups from among the respective table groups comprises dynamic tables, a second set of table groups from among the respective table groups comprises static tables, first schemas for the dynamic tables are determined via the accessing, and second schemas for the static tables are stored from prior snapshots of the computing objects.

In some examples, storing the snapshots at 625 includes storing respective schemas of respective tables included in the respective sets of tables. In some examples, the DMS 110-*c* may identify updates to one or more of the respective schemas with respect to immediately prior snapshots of the computing objects.

In some examples, an order in which the snapshots of the computing objects are stored at 625 is based at least in part on the respective table groups and the respective hierarchical relationships.

In some examples, the DMS 110-*c* may record respective tokens upon completion of storing respective table groups. In some examples, the DMS 110-*c* may pause the storing of the snapshots of the computing objects after storing a set of table groups included in the respective table groups. The DMS 110-*c* may resume the storing of the snapshots of the computing objects to store a remainder of the respective table groups, and the DMS 110-*c* may identify the remainder based on the respective tokens (e.g., storing the snapshots of the computing objects at 625 includes storing the remainder of the respective table groups).

In some examples, the DMS 110-*c* may receive a second request to restore a first computing object of the set of computing objects to the first storage environment (e.g., to the SaaS application 305-*c*). The DMS 110-*c* may identify, based on the second request, one or more second computing objects to restore based at least in part on the respective hierarchical relationships and a second set of APIs associated with the first computing object and the one or more second computing objects. The DMS 110-*c* may restore, via the second set of APIs, the first computing object and the one or more second computing objects from the snapshots in the second storage environment 605 to the first storage environment.

Figure 7:
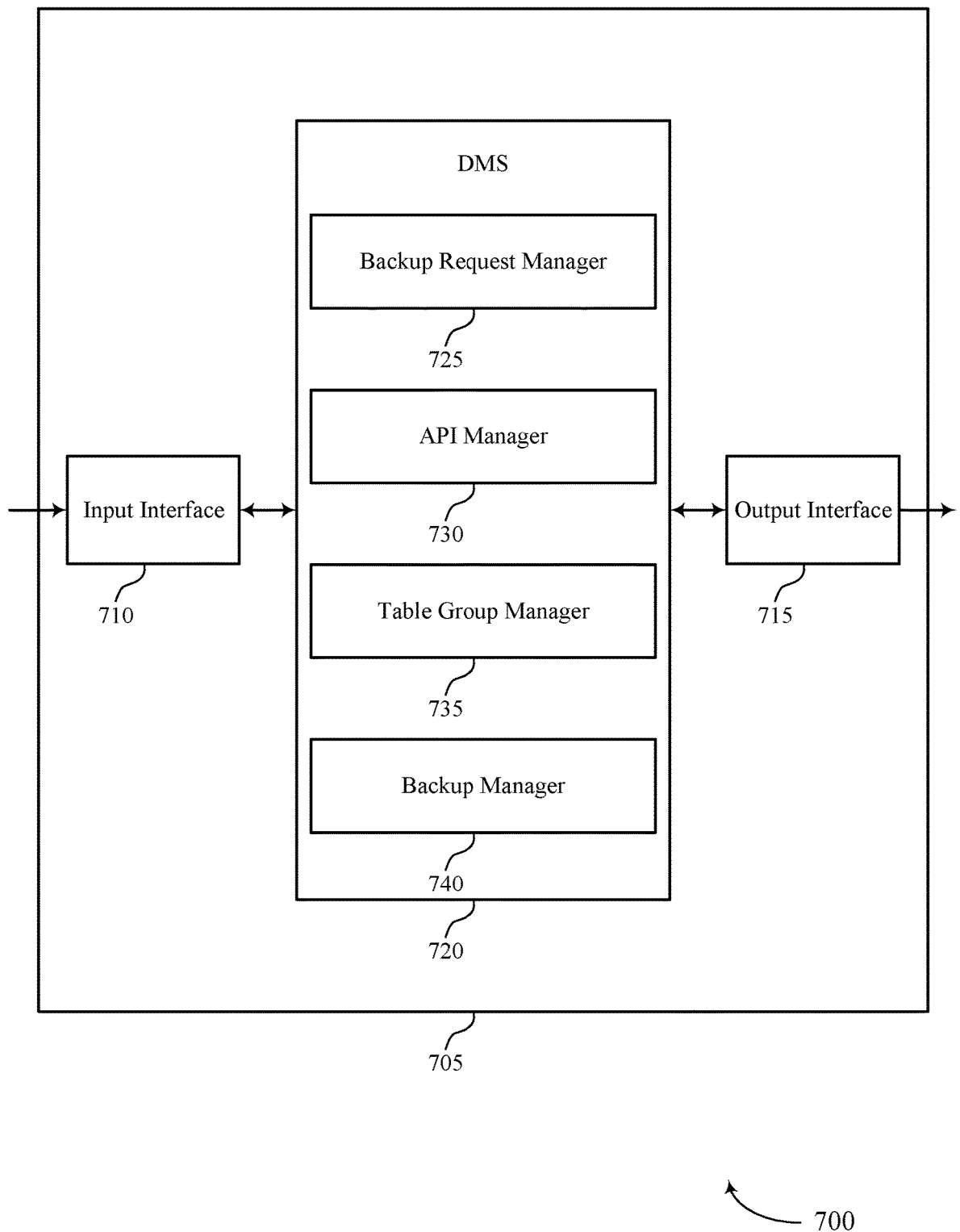
FIG. 7 shows a block diagram of an apparatus that supports relational SaaS data protection in accordance with aspects of the present disclosure.

FIG. 7 shows a block diagram 700 of a system 705 that supports relational SaaS data protection in accordance with aspects of the present disclosure. In some examples, the system 705 may be an example of aspects of one or more components described with reference to FIG. 1, such as a DMS 110. The system 705 may include an input interface 710, an output interface 715, and a DMS 720. The system 705 may also include one or more processors. Each of these components may be in communication with one another (e.g., via one or more buses, communications links, communications interfaces, or any combination thereof).

The input interface 710 may manage input signaling for the system 705. For example, the input interface 710 may receive input signaling (e.g., messages, packets, data, instructions, commands, or any other form of encoded information) from other systems or devices. The input interface 710 may send signaling corresponding to (e.g., representative of or otherwise based on) such input signaling to other components of the system 705 for processing. For example, the input interface 710 may transmit such corresponding signaling to the DMS 720 to support relational SaaS data protection. In some cases, the input interface 710 may be a component of a network interface 925 as described with reference to FIG. 9.

The output interface 715 may manage output signaling for the system 705. For example, the output interface 715 may receive signaling from other components of the system 705, such as the DMS 720, and may transmit such output signaling corresponding to (e.g., representative of or otherwise based on) such signaling to other systems or devices. In some cases, the output interface 715 may be a component of a network interface 925 as described with reference to FIG. 9.

For example, the DMS 720 may include a backup request manager 725, an API manager 730, a table group manager 735, a backup manager 740, or any combination thereof. In some examples, the DMS 720, or various components thereof, may be configured to perform various operations (e.g., receiving, monitoring, transmitting) using or otherwise in cooperation with the input interface 710, the output interface 715, or both. For example, the DMS 720 may receive information from the input interface 710, send information to the output interface 715, or be integrated in combination with the input interface 710, the output interface 715, or both to receive information, transmit information, or perform various other operations as described herein.

The backup request manager 725 may be configured as or otherwise support a means for receiving, by a DMS, a request to back up a SaaS application including a set of computing objects, where computing objects within the set of computing objects include respective sets of tables having respective hierarchical relationships. The API manager 730) may be configured as or otherwise support a means for accessing, by the DMS based on the request and via a set of APIs for a first storage environment associated with the SaaS application, the set of computing objects to obtain snapshots of the computing objects within the set of computing objects. The table group manager 735 may be configured as or otherwise support a means for assigning, by the DMS, tables within the respective sets of tables to respective table groups, where a table group includes one or more tables associated with a same group of one or more APIs from among the set of APIs. The backup manager 740 may be configured as or otherwise support a means for storing, by the DMS, the snapshots of the computing objects and information regarding the respective hierarchical relationships in a second storage environment associated with the DMS, where the snapshots include the respective sets of tables, and where, within the second storage environment, the respective sets of tables are stored in accordance with the assigned respective table groups.

Figure 8:
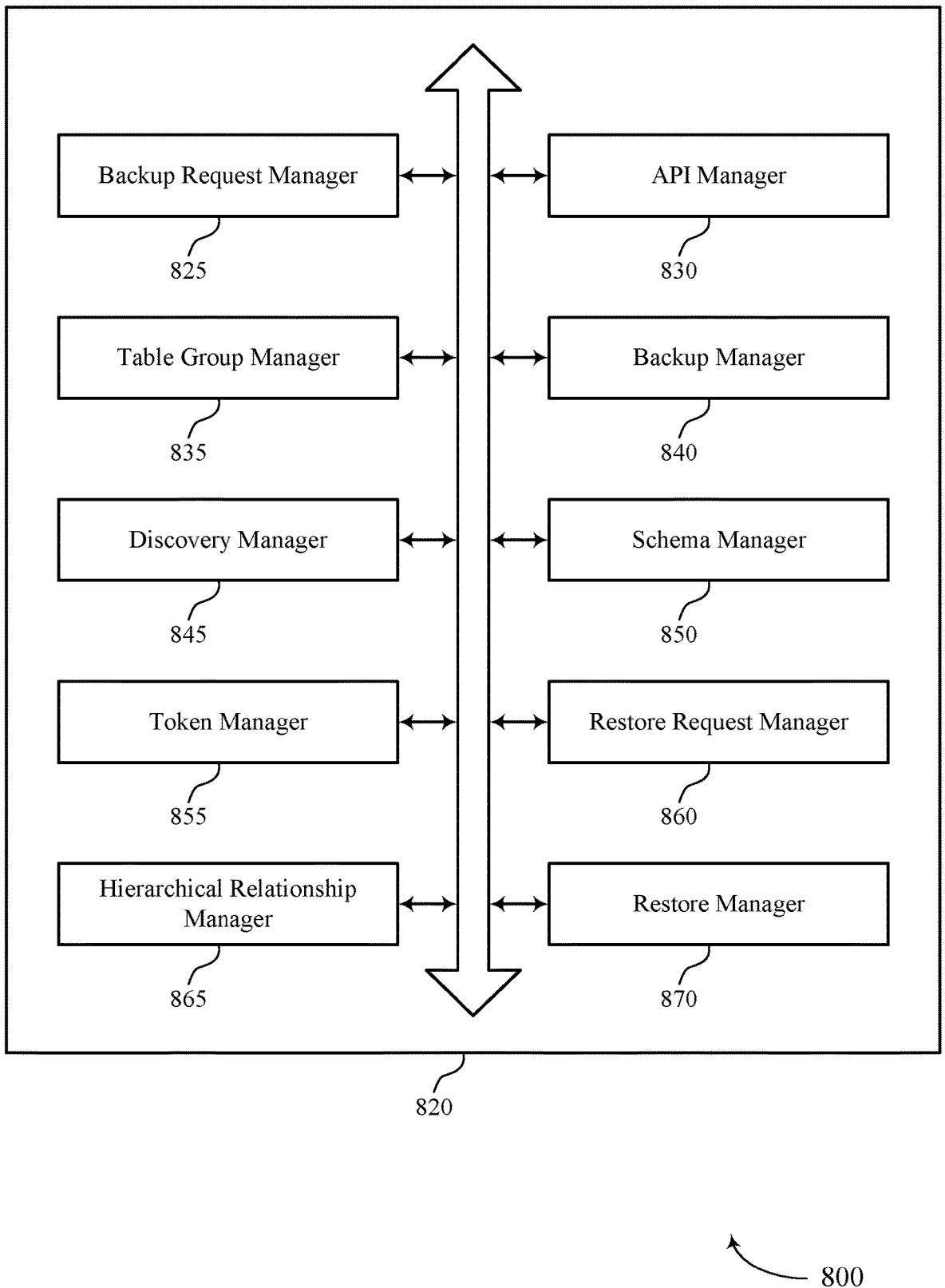
FIG. 8 shows a block diagram of a data management system (DMS) that supports relational SaaS data protection in accordance with aspects of the present disclosure.

FIG. 8 shows a block diagram 800 of a DMS 820 that supports relational SaaS data protection in accordance with aspects of the present disclosure. The DMS 820 may be an example of aspects of a DMS 110 or a DMS 720, or both, as described herein. The DMS 820, or various components thereof, may be an example of means for performing various aspects of relational SaaS data protection as described herein. For example, the DMS 820 may include a backup request manager 825, an API manager 830), a table group manager 835, a backup manager 840, a discovery manager 845, a schema manager 850, a token manager 855, a restore request manager 860, a hierarchical relationship manager 865, a restore manager 870, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The backup request manager 825 may be configured as or otherwise support a means for receiving, by a DMS, a request to back up a SaaS application including a set of computing objects, where computing objects within the set of computing objects include respective sets of tables having respective hierarchical relationships. The API manager 830) may be configured as or otherwise support a means for accessing, by the DMS based on the request and via a set of APIs for a first storage environment associated with the SaaS application, the set of computing objects to obtain snapshots of the computing objects within the set of computing objects. The table group manager 835 may be configured as or otherwise support a means for assigning, by the DMS, tables within the respective sets of tables to respective table groups, where a table group includes one or more tables associated with a same group of one or more APIs from among the set of APIs. The backup manager 840 may be configured as or otherwise support a means for storing, by the DMS, the snapshots of the computing objects and information regarding the respective hierarchical relationships in a second storage environment associated with the DMS, where the snapshots include the respective sets of tables, and where, within the second storage environment, the respective sets of tables are stored in accordance with the assigned respective table groups.

In some examples, the discovery manager 845 may be configured as or otherwise support a means for identifying, at a first time by the DMS and using the set of APIs, computing objects within the set of computing objects and a first hierarchical relationship of the set of computing objects, where the accessing, the assigning, and the storing is based on identification of the set of computing objects and the first hierarchical relationship.

In some examples, the discovery manager 845 may be configured as or otherwise support a means for identifying, at a second time by the DMS and via the set of APIs, an update to the computing objects within the set of computing objects and a second hierarchical relationship of the set of computing objects.

In some examples, the discovery manager 845 may be configured as or otherwise support a means for determining, by the DMS, that a time period since a last update to the computing objects within the set of computing objects satisfies a threshold time period, where identifying the update and the second hierarchical relationship is based on the determining that the time period since the last update satisfies the threshold time period.

In some examples, a first set of table groups from among the respective table groups includes dynamic tables. In some examples, a second set of table groups from among the respective table groups includes static tables. In some examples, first schemas for the dynamic tables are determined via the accessing. In some examples, second schemas for the static tables are stored from prior snapshots of the computing objects.

In some examples, to support storing the snapshots, the schema manager 850 may be configured as or otherwise support a means for storing respective schemas of respective tables included in the respective sets of tables.

In some examples, to support storing the respective schemas of the respective tables included in the respective sets of tables, the schema manager 850 may be configured as or otherwise support a means for identifying updates to one or more of the respective schemas with respect to immediately prior snapshots of the computing objects.

In some examples, an order in which the snapshots of the computing objects are stored is based on the respective table groups and the respective hierarchical relationships.

In some examples, the token manager 855 may be configured as or otherwise support a means for recording, by the DMS, respective tokens upon completion of storing respective table groups.

In some examples, the backup manager 840 may be configured as or otherwise support a means for pausing the storing of the snapshots of the computing objects after storing a set of table groups included in the respective table groups. In some examples, the backup manager 840 may be configured as or otherwise support a means for resuming the storing of the snapshots of the computing objects to store a remainder of the respective table groups, where the remainder is identified based on the respective tokens, and where storing the snapshots of the computing objects includes storing the remainder of the respective table groups.

In some examples, the restore request manager 860 may be configured as or otherwise support a means for receiving, by the DMS, a second request to restore a first computing object of the set of computing objects to the first storage environment. In some examples, the hierarchical relationship manager 865 may be configured as or otherwise support a means for identifying, by the DMS and based on the second request, one or more second computing objects to restore based on the respective hierarchical relationships. In some examples, the API manager 830 may be configured as or otherwise support a means for identifying, a second set of APIs associated with the first computing object and the one or more second computing objects. In some examples, the restore manager 870 may be configured as or otherwise support a means for restoring, by the DMS and via the second set of APIs, the first computing object and the one or more second computing objects from the snapshots in the second storage environment to the first storage environment.

In some examples, to support receiving the request, the backup request manager 825 may be configured as or otherwise support a means for receiving the request from a computing device associated with a user account of the DMS.

In some examples, to support receiving the request, the backup request manager 825 may be configured as or otherwise support a means for identifying that a time for a scheduled backup operation for the SaaS application has been satisfied.

Figure 9:
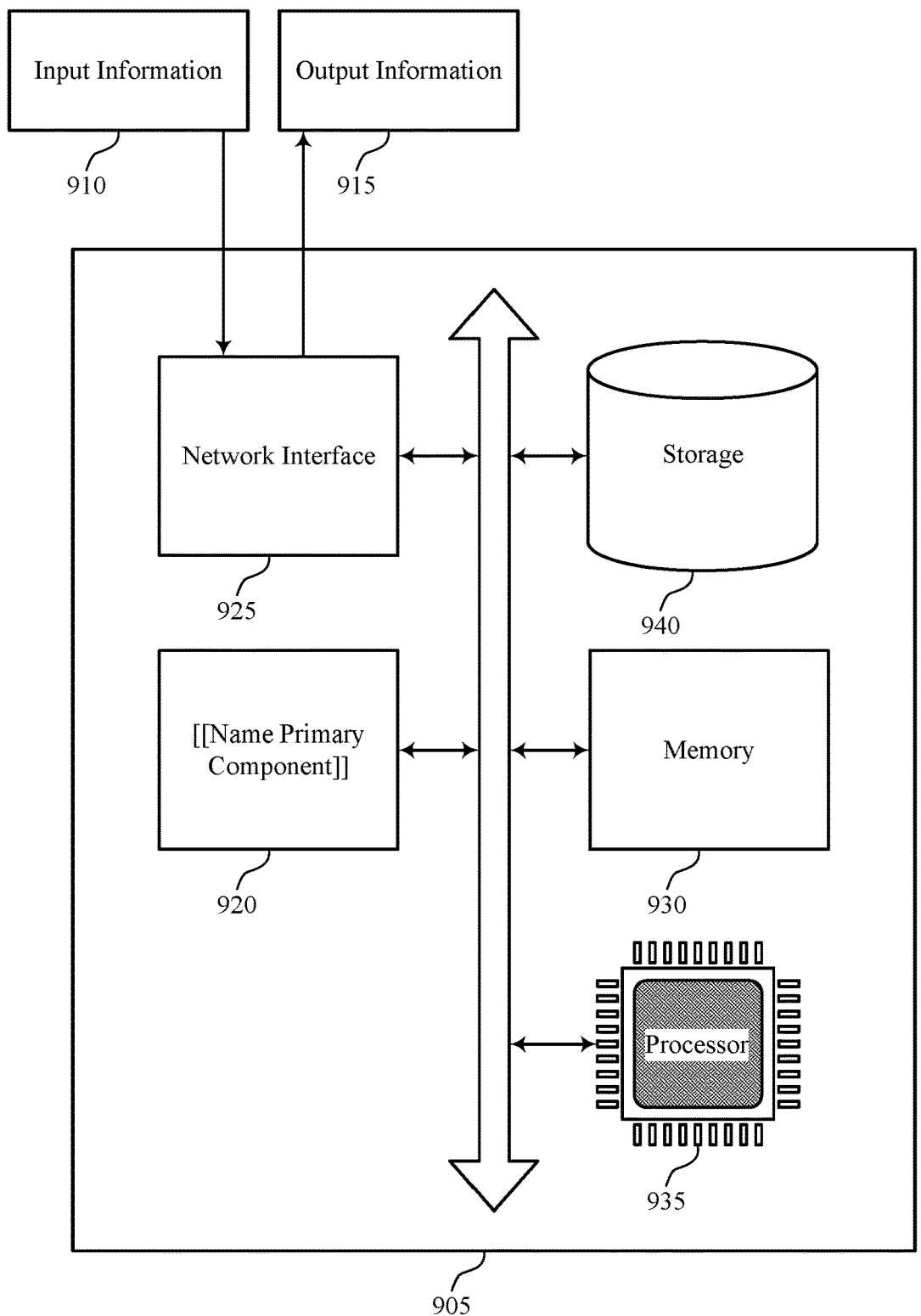
FIG. 9 shows a diagram of a system including a device that supports relational SaaS data protection in accordance with aspects of the present disclosure.

FIG. 9 shows a block diagram 900 of a system 905 that supports relational SaaS data protection in accordance with aspects of the present disclosure. The system 905 may be an example of or include the components of a system 705 as described herein. The system 905 may include components for data management, including components such as a DMS 920, an input information 910, an output information 915, a network interface 925, at least one memory 930, at least one processor 935, and a storage 940. These components may be in electronic communication or otherwise coupled with each other (e.g., operatively, communicatively, functionally, electronically, electrically: via one or more buses, communications links, communications interfaces, or any combination thereof). Additionally, the components of the system 905 may include corresponding physical components or may be implemented as corresponding virtual components (e.g., components of one or more virtual machines). In some examples, the system 905 may be an example of aspects of one or more components described with reference to FIG. 1, such as a DMS 110.

The network interface 925 may enable the system 905 to exchange information (e.g., input information 910, output information 915, or both) with other systems or devices (not shown). For example, the network interface 925 may enable the system 905 to connect to a network (e.g., a network 120 as described herein). The network interface 925 may include one or more wireless network interfaces, one or more wired network interfaces, or any combination thereof. In some examples, the network interface 925 may be an example of may be an example of aspects of one or more components described with reference to FIG. 1, such as one or more network interfaces 165.

Memory 930 may include RAM, ROM, or both. The memory 930 may store computer-readable, computer-executable software including instructions that, when executed, cause the processor 935 to perform various functions described herein. In some cases, the memory 930 may contain, among other things, a basic input/output system (BIOS), which may control basic hardware or software operation such as the interaction with peripheral components or devices. In some cases, the memory 930 may be an example of aspects of one or more components described with reference to FIG. 1, such as one or more memories 175.

The processor 935 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 935 may be configured to execute computer-readable instructions stored in a memory 930 to perform various functions (e.g., functions or tasks supporting relational SaaS data protection). Though a single processor 935 is depicted in the example of FIG. 9, it is to be understood that the system 905 may include any quantity of one or more of processors 935 and that a group of processors 935 may collectively perform one or more functions ascribed herein to a processor, such as the processor 935. In some cases, the processor 935 may be an example of aspects of one or more components described with reference to FIG. 1, such as one or more processors 170.

Storage 940 may be configured to store data that is generated, processed, stored, or otherwise used by the system 905. In some cases, the storage 940 may include one or more HDDs, one or more SDDs, or both. In some examples, the storage 940 may be an example of a single database, a distributed database, multiple distributed databases, a data store, a data lake, or an emergency backup database. In some examples, the storage 940 may be an example of one or more components described with reference to FIG. 1, such as one or more network disks 180.

For example, the DMS 920 may be configured as or otherwise support a means for receiving, by a DMS, a request to back up a SaaS application including a set of computing objects, where computing objects within the set of computing objects include respective sets of tables having respective hierarchical relationships. The DMS 920 may be configured as or otherwise support a means for accessing, by the DMS based on the request and via a set of APIs for a first storage environment associated with the SaaS application, the set of computing objects to obtain snapshots of the computing objects within the set of computing objects. The DMS 920 may be configured as or otherwise support a means for assigning, by the DMS, tables within the respective sets of tables to respective table groups, where a table group includes one or more tables associated with a same group of one or more APIs from among the set of APIs. The DMS 920 may be configured as or otherwise support a means for storing, by the DMS, the snapshots of the computing objects and information regarding the respective hierarchical relationships in a second storage environment associated with the DMS, where the snapshots include the respective sets of tables, and where, within the second storage environment, the respective sets of tables are stored in accordance with the assigned respective table groups.

By including or configuring the DMS 920 in accordance with examples as described herein, the system 905 may support techniques for relational SaaS data protection, which may provide one or more benefits such as, for example, improved reliability, reduced latency, improved user experience, more efficient utilization of computing resources, network resources or both, improved scalability, or improved security, among other possibilities.

Figure 10:
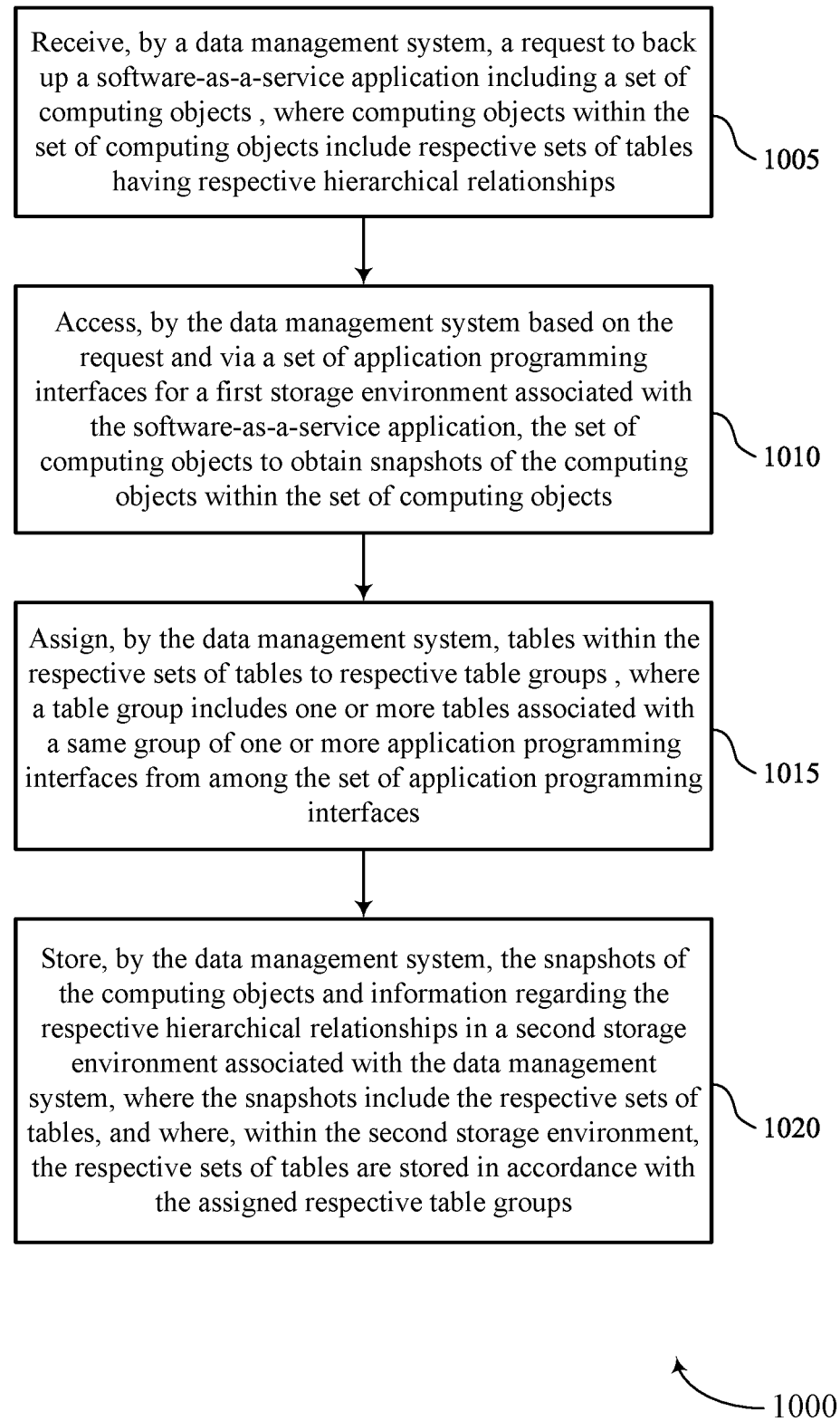
FIG. 10 shows a flowchart illustrating methods that support relational SaaS data protection in accordance with aspects of the present disclosure.

FIG. 10 shows a flowchart illustrating a method 1000 that supports relational SaaS data protection in accordance with aspects of the present disclosure. The operations of the method 1000 may be implemented by a DMS or its components as described herein. For example, the operations of the method 1000 may be performed by a DMS as described with reference to FIGS. 1 through 9. In some examples, a DMS may execute a set of instructions to control the functional elements of the DMS to perform the described functions. Additionally, or alternatively, the DMS may perform aspects of the described functions using special-purpose hardware.

At 1005, the method may include receiving, by a DMS, a request to back up a SaaS application including a set of computing objects, where computing objects within the set of computing objects include respective sets of tables having respective hierarchical relationships. The operations of block 1005 may be performed in accordance with examples as disclosed herein. In some examples, aspects of the operations of 1005 may be performed by a backup request manager 825 as described with reference to FIG. 8.

At 1010, the method may include accessing, by the DMS based on the request and via a set of APIs for a first storage environment associated with the SaaS application, the set of computing objects to obtain snapshots of the computing objects within the set of computing objects. The operations of block 1010 may be performed in accordance with examples as disclosed herein. In some examples, aspects of the operations of 1010 may be performed by an API manager 830 as described with reference to FIG. 8.

At 1015, the method may include assigning, by the DMS, tables within the respective sets of tables to respective table groups, where a table group includes one or more tables associated with a same group of one or more APIs from among the set of APIs. The operations of block 1015 may be performed in accordance with examples as disclosed herein. In some examples, aspects of the operations of 1015 may be performed by a table group manager 835 as described with reference to FIG. 8.

At 1020, the method may include storing, by the DMS, the snapshots of the computing objects and information regarding the respective hierarchical relationships in a second storage environment associated with the DMS, where the snapshots include the respective sets of tables, and where, within the second storage environment, the respective sets of tables are stored in accordance with the assigned respective table groups. The operations of block 1020 may be performed in accordance with examples as disclosed herein. In some examples, aspects of the operations of 1020 may be performed by a backup manager 840 as described with reference to FIG. 8.

A method by an apparatus is described. The method may include receiving, by a DMS, a request to back up a SaaS application including a set of computing objects, where computing objects within the set of computing objects include respective sets of tables having respective hierarchical relationships, accessing, by the DMS based on the request and via a set of APIs for a first storage environment associated with the SaaS application, the set of computing objects to obtain snapshots of the computing objects within the set of computing objects, assigning, by the DMS, tables within the respective sets of tables to respective table groups, where a table group includes one or more tables associated with a same group of one or more APIs from among the set of APIs, and storing, by the DMS, the snapshots of the computing objects and information regarding the respective hierarchical relationships in a second storage environment associated with the DMS, where the snapshots include the respective sets of tables, and where, within the second storage environment, the respective sets of tables are stored in accordance with the assigned respective table groups.

An apparatus is described. The apparatus may include one or more memories storing processor executable code, and one or more processors coupled with the one or more memories. The one or more processors may individually or collectively operable to execute the code to cause the apparatus to receive, by a DMS, a request to back up a SaaS application including a set of computing objects, where computing objects within the set of computing objects include respective sets of tables having respective hierarchical relationships, access, by the DMS based on the request and via a set of APIs for a first storage environment associated with the SaaS application, the set of computing objects to obtain snapshots of the computing objects within the set of computing objects, assign, by the DMS, tables within the respective sets of tables to respective table groups, where a table group includes one or more tables associated with a same group of one or more APIs from among the set of APIs, and store, by the DMS, the snapshots of the computing objects and information regarding the respective hierarchical relationships in a second storage environment associated with the DMS, where the snapshots include the respective sets of tables, and where, within the second storage environment, the respective sets of tables are stored in accordance with the assigned respective table groups.

Another apparatus is described. The apparatus may include means for receiving, by a DMS, a request to back up a SaaS application including a set of computing objects, where computing objects within the set of computing objects include respective sets of tables having respective hierarchical relationships, means for accessing, by the DMS based on the request and via a set of APIs for a first storage environment associated with the SaaS application, the set of computing objects to obtain snapshots of the computing objects within the set of computing objects, means for assigning, by the DMS, tables within the respective sets of tables to respective table groups, where a table group includes one or more tables associated with a same group of one or more APIs from among the set of APIs, and means for storing, by the DMS, the snapshots of the computing objects and information regarding the respective hierarchical relationships in a second storage environment associated with the DMS, where the snapshots include the respective sets of tables, and where, within the second storage environment, the respective sets of tables are stored in accordance with the assigned respective table groups.

A non-transitory computer-readable medium storing code is described. The code may include instructions executable by a processor to receive, by a DMS, a request to back up a SaaS application including a set of computing objects, where computing objects within the set of computing objects include respective sets of tables having respective hierarchical relationships, access, by the DMS based on the request and via a set of APIs for a first storage environment associated with the SaaS application, the set of computing objects to obtain snapshots of the computing objects within the set of computing objects, assign, by the DMS, tables within the respective sets of tables to respective table groups, where a table group includes one or more tables associated with a same group of one or more APIs from among the set of APIs, and store, by the DMS, the snapshots of the computing objects and information regarding the respective hierarchical relationships in a second storage environment associated with the DMS, where the snapshots include the respective sets of tables, and where, within the second storage environment, the respective sets of tables are stored in accordance with the assigned respective table groups.

Some examples of the method, apparatus, and non-transitory computer-readable medium described herein may further include operations, features, means, or instructions for identifying, at a first time by the DMS and using the set of APIs, computing objects within the set of computing objects and a first hierarchical relationship of the set of computing objects, where the accessing, the assigning, and the storing may be based on identification of the set of computing objects and the first hierarchical relationship.

Some examples of the method, apparatus, and non-transitory computer-readable medium described herein may further include operations, features, means, or instructions for identifying, at a second time by the DMS and via the set of APIs, an update to the computing objects within the set of computing objects and a second hierarchical relationship of the set of computing objects.

Some examples of the method, apparatus, and non-transitory computer-readable medium described herein may further include operations, features, means, or instructions for determining, by the DMS, that a time period since a last update to the computing objects within the set of computing objects satisfies a threshold time period, where identifying the update and the second hierarchical relationship may be based on the determining that the time period since the last update satisfies the threshold time period.

In some examples of the method, apparatus, and non-transitory computer-readable medium described herein, a first set of table groups from among the respective table groups includes dynamic tables, a second set of table groups from among the respective table groups includes static tables, first schemas for the dynamic tables may be determined via the accessing, and second schemas for the static tables may be stored from prior snapshots of the computing objects.

In some examples of the method, apparatus, and non-transitory computer-readable medium described herein, storing the snapshots may include operations, features, means, or instructions for storing respective schemas of respective tables included in the respective sets of tables.

In some examples of the method, apparatus, and non-transitory computer-readable medium described herein, storing the respective schemas of the respective tables included in the respective sets of tables may include operations, features, means, or instructions for identifying updates to one or more of the respective schemas with respect to immediately prior snapshots of the computing objects.

In some examples of the method, apparatus, and non-transitory computer-readable medium described herein, an order in which the snapshots of the computing objects may be stored may be based on the respective table groups and the respective hierarchical relationships.

In some examples of the method, apparatus, and non-transitory computer-readable medium described herein, recording, by the DMS, respective tokens upon completion of storing respective table groups.

Some examples of the method, apparatus, and non-transitory computer-readable medium described herein may further include operations, features, means, or instructions for pausing the storing of the snapshots of the computing objects after storing a set of table groups included in the respective table groups and resuming the storing of the snapshots of the computing objects to store a remainder of the respective table groups, where the remainder may be identified based on the respective tokens, and where storing the snapshots of the computing objects includes storing the remainder of the respective table groups.

Some examples of the method, apparatus, and non-transitory computer-readable medium described herein may further include operations, features, means, or instructions for receiving, by the DMS, a second request to restore a first computing object of the set of computing objects to the first storage environment, identifying, by the DMS and based on the second request, one or more second computing objects to restore based on the respective hierarchical relationships, identifying, a second set of APIs associated with the first computing object and the one or more second computing objects, and restoring, by the DMS and via the second set of APIs, the first computing object and the one or more second computing objects from the snapshots in the second storage environment to the first storage environment.

In some examples of the method, apparatus, and non-transitory computer-readable medium described herein, receiving the request may include operations, features, means, or instructions for receiving the request from a computing device associated with a user account of the DMS.

In some examples of the method, apparatus, and non-transitory computer-readable medium described herein, receiving the request may include operations, features, means, or instructions for identifying that a time for a scheduled backup operation for the SaaS application may have been satisfied.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
  receiving, by a data management system, a request to back up a software-as-a-service application comprising a set of computing objects, wherein computing objects within the set of computing objects comprise respective sets of tables having respective hierarchical relationships;
  accessing, by the data management system based at least in part on the request and via a set of application programming interfaces for a first storage environment associated with the software-as-a-service application, the set of computing objects to obtain snapshots of the computing objects within the set of computing objects;

assigning, by the data management system, tables within the respective sets of tables to respective table groups, wherein a table group comprises one or more tables associated with a same group of one or more application programming interfaces from among the set of application programming interfaces; and storing, by the data management system, the snapshots of the computing objects and information regarding the respective hierarchical relationships in a second storage environment associated with the data management system, wherein the snapshots comprise the respective sets of tables, and wherein, within the second storage environment, the respective sets of tables are stored in accordance with the assigned respective table groups.

2. The method of claim 1, further comprising:
identifying, at a first time by the data management system and using the set of application programming interfaces, computing objects within the set of computing objects and a first hierarchical relationship of the set of computing objects, wherein the accessing, the assigning, and the storing is based at least in part on identification of the set of computing objects and the first hierarchical relationship.

3. The method of claim 1, further comprising:
identifying, at a second time by the data management system and via the set of application programming interfaces, an update to the computing objects within the set of computing objects and a second hierarchical relationship of the set of computing objects.

4. The method of claim 3, further comprising:
determining, by the data management system, that a time period since a last update to the computing objects within the set of computing objects satisfies a threshold time period, wherein identifying the update and the second hierarchical relationship is based at least in part on the determining that the time period since the last update satisfies the threshold time period.

5. The method of claim 1, wherein:
a first set of table groups from among the respective table groups comprises dynamic tables,
a second set of table groups from among the respective table groups comprises static tables,
first schemas for the dynamic tables are determined via the accessing, and
second schemas for the static tables are stored from prior snapshots of the computing objects.

6. The method of claim 1, wherein storing the snapshots comprises:
storing respective schemas of respective tables included in the respective sets of tables.

7. The method of claim 6, wherein storing the respective schemas of the respective tables included in the respective sets of tables comprises:
identifying updates to one or more of the respective schemas with respect to immediately prior snapshots of the computing objects.

8. The method of claim 1, wherein an order in which the snapshots of the computing objects are stored is based at least in part on the respective table groups and the respective hierarchical relationships.

9. The method of claim 1, further comprising:
recording, by the data management system, respective tokens upon completion of storing respective table groups.

10. The method of claim 9, further comprising:
pausing the storing of the snapshots of the computing objects after storing a set of table groups included in the respective table groups; and
resuming the storing of the snapshots of the computing objects to store a remainder of the respective table groups, wherein the remainder is identified based at least in part on the respective tokens, and wherein storing the snapshots of the computing objects comprises storing the remainder of the respective table groups.

11. The method of claim 1, further comprising:
receiving, by the data management system, a second request to restore a first computing object of the set of computing objects to the first storage environment;
identifying, by the data management system and based at least in part on the second request, one or more second computing objects to restore based at least in part on the respective hierarchical relationships;
identifying, a second set of application programming interfaces associated with the first computing object and the one or more second computing objects; and
restoring, by the data management system and via the second set of application programming interfaces, the first computing object and the one or more second computing objects from the snapshots in the second storage environment to the first storage environment.

12. The method of claim 1, wherein receiving the request comprises:
receiving the request from a computing device associated with a user account of the data management system.

13. The method of claim 1, wherein receiving the request comprises:
identifying that a time for a scheduled backup operation for the software-as-a-service application has been satisfied.

14. An apparatus, comprising:
one or more memories storing processor-executable code; and
one or more processors coupled with the one or more memories and individually or collectively operable to execute the code to cause the apparatus to:
receive, by a data management system, a request to back up a software-as-a-service application comprising a set of computing objects, wherein computing objects within the set of computing objects comprise respective sets of tables having respective hierarchical relationships;
access, by the data management system based at least in part on the request and via a set of application programming interfaces for a first storage environment associated with the software-as-a-service application, the set of computing objects to obtain snapshots of the computing objects within the set of computing objects;
assign, by the data management system, tables within the respective sets of tables to respective table groups, wherein a table group comprises one or more tables associated with a same group of one or more application programming interfaces from among the set of application programming interfaces; and
store, by the data management system, the snapshots of the computing objects and information regarding the respective hierarchical relationships in a second storage environment associated with the data management system, wherein the snapshots comprise the respective sets of tables, and wherein the one or more processors are individually or collectively operable to execute the code to cause the apparatus to store the respective sets of tables within the second storage environment in accordance with the assigned respective table groups.

15. The apparatus of claim 14, wherein the one or more processors are individually or collectively further operable to execute the code to cause the apparatus to:

identify, at a first time by the data management system and using the set of application programming interfaces, computing objects within the set of computing objects and a first hierarchical relationship of the set of computing objects, wherein the one or more processors are individually or collectively operable to execute the code to cause the apparatus to perform the accessing, the assigning, and the storing based at least in part on identification of the set of computing objects and the first hierarchical relationship.

16. The apparatus of claim 14, wherein the one or more processors are individually or collectively further operable to execute the code to cause the apparatus to:

identify, at a second time by the data management system and via the set of application programming interfaces, an update to the computing objects within the set of computing objects and a second hierarchical relationship of the set of computing objects.

17. The apparatus of claim 16, wherein the one or more processors are individually or collectively further operable to execute the code to cause the apparatus to:

determine, by the data management system, that a time period since a last update to the computing objects within the set of computing objects satisfies a threshold time period, wherein the one or more processors are individually or collectively operable to execute the code to cause the apparatus to identify the update and the second hierarchical relationship based at least in part on the determining that the time period since the last update satisfies the threshold time period.

18. The apparatus of claim 14, wherein:

a first set of table groups from among the respective table groups comprises dynamic tables, a second set of table groups from among the respective table groups comprises static tables, first schemas for the dynamic tables are determined via the accessing, and second schemas for the static tables are stored from prior snapshots of the computing objects.

19. The apparatus of claim 14, wherein, to store the snapshots, the one or more processors are individually or collectively operable to execute the code to cause the apparatus to:

store respective schemas of respective tables included in the respective sets of tables.

20. A non-transitory computer-readable medium storing code, the code comprising instructions executable by one or more processors to:

receive, by a data management system, a request to back up a software-as-a-service application comprising a set of computing objects, wherein computing objects within the set of computing objects comprise respective sets of tables having respective hierarchical relationships;

access, by the data management system based at least in part on the request and via a set of application programming interfaces for a first storage environment associated with the software-as-a-service application, the set of computing objects to obtain snapshots of the computing objects within the set of computing objects;

assign, by the data management system, tables within the respective sets of tables to respective table groups, wherein a table group comprises one or more tables associated with a same group of one or more application programming interfaces from among the set of application programming interfaces; and store, by the data management system, the snapshots of the computing objects and information regarding the respective hierarchical relationships in a second storage environment associated with the data management system, wherein the snapshots comprise the respective sets of tables, and wherein, within the second storage environment, the respective sets of tables are stored in accordance with the assigned respective table groups.

* * * * *